United States Patent Office 3,380,886
Patented Apr. 30, 1968

3,380,886
7α-METHYL-3β-HYDROXY-5-ANDROSTENES
J. Allan Campbell and John C. Babcock, Kalamazoo,
Mich., assignors to The Upjohn Company, Kalamazoo,
Mich., a corporation of Delaware
No Drawing. Filed Apr. 7, 1965, Ser. No. 446,396
25 Claims. (Cl. 167—65)

ABSTRACT OF THE DISCLOSURE

This invention relates to novel steroids, more particularly 7(α and β)-methyl-3β-hydroxy-5-androstenes, 2α, 7(α and β)-dimethyl-3β-hydroxy-5-androstenes and their 19-nor counterparts of the formula

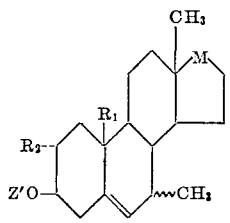

wherein ʃ is a generic expression denoting α- and β-bonds and mixtures thereof; $R_1$ and $R_2$ are selected from the group consisting of hydrogen and methyl; $Z'$ is selected from the group consisting of hydrogen and the lower acyl radical of a hydrocarbon carboxylic acid containing from one to twelve carbon atoms, inclusive, and tetrahydropyranyl; M is selected from the group consisting of

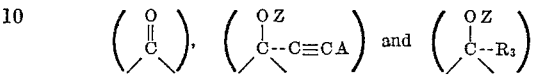

wherein A is selected from the group consisting of hydrogen, lower-alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z has the same meaning as $Z'$.

The compounds of the present invention and the processes for their production are illustratively represented by the following sequence of formulae:

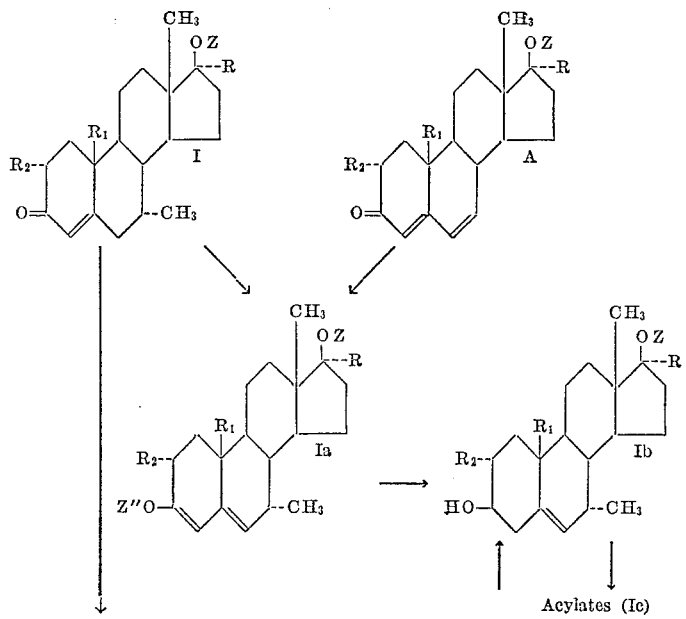

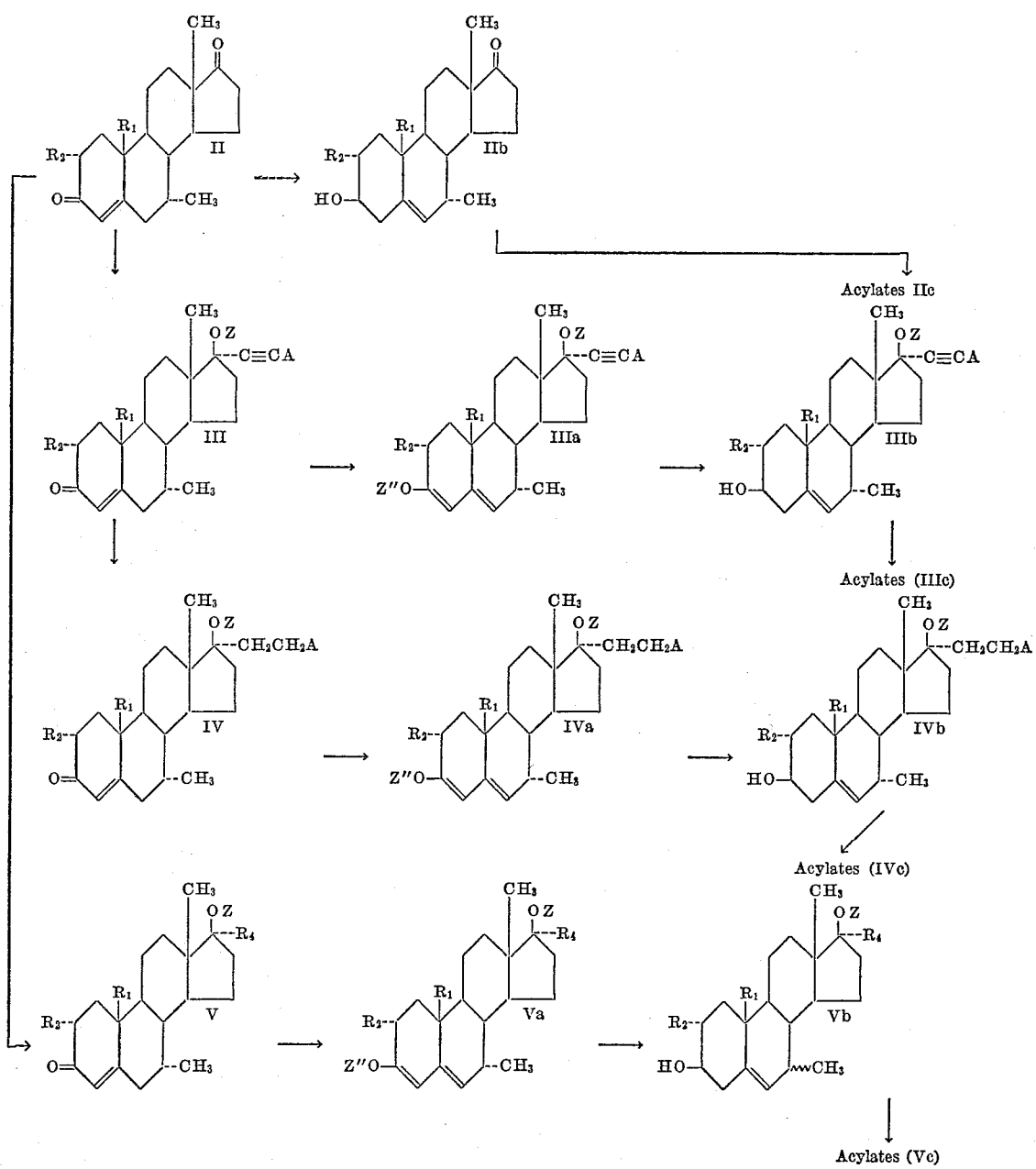

wherein $R_1$, $R_2$, $Z'$ and A have the same meaning as above; R has the same meaning as $R_1$; $R_4$ is a lower alkyl radical containing from one to twelve carbon atoms, inclusive; $Z''$ is selected from the group consisting of tetrahydropyranyl and the acyl radical of a hydrocarbon carboxylic acid containing from one to twelve carbon atoms inclusive.

The 3β-hydroxy-5-androstenes of the invention are prepared from the known 7α-methyl-4-androstene starting materials of Formula I of the flow-sheet, above, which are synthesized in the manner of Campbell and Babcock (J. Amer. Chem. Soc., 81, 4069). The corresponding 2α,7α-dimethyl compounds (I) are produced in accordance with the procedures of U.S. Patent 2,923,720.

Oxidation of the compounds of Formula I, e.g., 7α-methyl-19-nor-17β-hydroxy-4-androstene-3-one (I) and 2α,7α-dimethyl-17β-hydroxy-4-androstene-3-one (I), with oxidizing agents such as chromic acid, sodium dichromate, potassium dichromate, and the like, using procedures known in the art, yields 7α-methyl-19-nor-4-androstene-17-one (II) and 2α,7α-dimethyl-4-androstene-3,17-dione (I).

The 7α-methyl (and 2α,7α-dimethyl)-3,17-diketo-4-androstenes of Formula II, prior to the formation of their corresponding 17α-alkynyl and haloalkynyl derivatives (III), must first be converted to the corresponding 3-enamines, 3-ketals, or 3-enol ethers in order to protect the 3-keto function from reduction. The 3-enamine formation can be accomplished in the manner described in U.S. Patent 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethylpyrrolidine, 3-ethylpyrrolidine, 3 - isopropylpyrrolidine, 2 - methylmorpholine, 3-methylmorpholine, and the like. Pyrrolidine is the preferred amine for use in the above reaction.

Advantageously, the 3-enamine is prepared by heating the 7α-methyl (and 2α,7α-dimethyl)-4-androstene-3,17- diones (II) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 7α-methyl (and 2α,7α-dimethyl)-4-androstene-3,17-diones (II) so obtained are then reacted with an alkali metal derivative, for example, the sodium or potassium derivative of the appropriate alkyne. The reaction is carried out preferably in the presence of an anhydrous inert solvent such as dimethylformamide, dimethylsulfoxide, tetrahydrofuran and the like. The 3-enamines of the 7α-methyl (and 2α,7α-dimethyl)-17α-alkynyltestosterones (III) so obtained are not generally isolated from the reaction mixture but are hydrolyzed in situ to the free 7-methyl (and 2α,7α-dimethyl)-17α-alkynyltestosterones (III) by treatment with an aqueous solution of a base such as sodium hydroxide, potassium hydroxide, and the like, after first decomposing the reaction mixture with water, ammonium chloride, and the like.

The 7α-methyl (and 2α,7α-dimethyl)-17α-alkynyltestosterones (III) so obtained can be purified, if desired, by procedures known in the art such as by recrystallization, chromatography, and the like.

The 7α-methyl (and 2α,7α-dimethyl)-17α-alkynyltestosterones (III) can also be prepared by reacting the 3-enamines of the 7α-methyl(and 2α,7α-dimethyl)-4-androstene-3,17-diones (II), prepared as described above, with the appropriate alkynyl magnesium halide. The reaction is preferably carried out in the presence of a solvent such as dimethyl ether, tetrahydrofuran, and the like. Preferably, the Grignard reagent is employed in an excess of the order of 10 moles per mole of the 3-enamine. The 3-anamines of 7α-methyl(and 2α,7α-dimethyl)-17α-alkynyltestosterone (III) so obtained are generally not isolated from the reaction mixture but are hydrolyzed in situ to the free 7α-methyl(and 2α,7α-dimethyl)-17α-alkynyltestosterones (III) by the method described above.

In converting the 7α-methyl(and 2α,7α-dimethyl)-3,17β-diketo-4-androstenes (II) to their corresponding 17α-alkynyl and haloalkynyl derivatives (III), 3-keto protecting groups in addition to the 3-enamines described above, such as 3-ketals and 3-enol ethers, can be employed. Treatment of a 3-ketal or 3-enol ether of a compound of Formula II with an alkali metal derivative, e.g., an appropriate alkyne or haloalkyne, yields the corresponding 17α-alkynyl derivative, which on hydrolysis gives the corresponding 3-ketone of Formula III. Methods for the preparation of 3-ketals and 3-enol ethers of a variety of 3-keto compounds of the androstane series, and their subsequent alkynylation or haloalkynylation, are described in detail in J. Chem. Soc. 4995 (1962). Methods for the preparation of 3-enol ethers are also described in U.S. Patent 3,114,757.

The alkynyl compounds of Formula III can be readily reduced at the 17α-position exclusively (e.g., with hydrogen in the presence of a palladium catalyst) to give the corresponding saturated compound (IV). For example, by employing the foregoing procedure, 7α-methyl-19-nor-17β-hydroxy-17α-ethynyl-4-androsten-3-one (IV).

The 17-ketones represented by Formula II can be converted to the corresponding 17β-hydroxy-17α-alkyl derivatives (V) by treatment with an appropriate alkylating agent such as an appropriate Grignard reagent or alkyl lithium compound. For example, 7α-methyl-19-nor-4-androsten-17-one (II) when heated under reflux in an inert solvent (e.g., benzene-tetrahydrofuran) with methylmagnesium bromide yields 7α,17α-dimethyl-19-nor-17β-hydroxy-4-androstene (V). Before converting the compounds of Formula II to the 17α-alkyl compounds (V) by the above procedure, it is necessary to first attach a protecting group at the 3-position, e.g., an enamine; this can be carried out in the manner described hereinbefore for preparing the 17α-alkynyl compounds (III) from the corresponding 17-ketones (II). The 17α-alkylate-3-enamine produced by the reaction of an appropriate alkylating agent (e.g., a Grignard reagent or alkyl lithium) with a 3-enamine of a compound of Formula II is generally not isolated from the reaction mixture, but is hydrolyzed in situ to the corresponding 7α-methyl(or 2α,7α-dimethyl)-17α-alkyl derivative (V) by treatment with an aqueous solution of a base such as sodium hydroxide, potassium hydroxide, etc., after first decomposing the reaction mixture with water, ammonium chloride, and the like. By following the foregoing procedure, 2α,7α-dimethyl-4-androstene-3,17-dione 3-pyrrolidinyl enamine (II) is converted to 2α,7α-17α-trimethyl-17β-hydroxy-4-androsten-3-one (V).

The Δ⁴-3-ketones represented by Formulae I, III, IV and V of the flow-sheet, above, are readily converted to the corresponding 3(enol), 17-diacylates of Formulae Ia, IIIa, IVa and Va, respectively. The 3,17-diketones of Formula II are transformed to the corresponding 3-enol acylates (IIa) without reaction at the 17-position by using mild acylating conditions (e.g., as in U.S. Patent 3,114,757). This conversion is a well known reaction. Treating the Δ⁴-3-ketone with an anhydride, an acyl chloride, or acyl bromide of an organic carboxylic acid, preferably a hydrocarbon carboxylic acid containing from one to twelve carbon atoms, inclusive, in the presence of an acid catalyst such as paratoluene-sulfonic acid, perchloric acid, sulfuric acid, and the like, or with an isopropenyl acylate wherein the acyl group is that of a hydrocarbon carboxylic acid as defined above, yields the corresponding 3,17-diacyl-3,5-diene. The reaction is carried out at the reflux temperature of the reaction mixture, e.g., between about 40° C. to about 150° C. A large excess of acylating agent, two to twenty moles per mole of Δ⁴-3-ketone, is usually employed. Aromatic hydrocarbons, e.g., benzene or toluene, as well as methylene chloride, chloroform, and carbon tetrachloride, are convenient solvents for the acylation reaction. The 3,17-diacylate products can be isolated by removing the solvents by evaporation under diminished pressure or atmospheric pressure (preferably in an atmosphere of nitrogen), and washing the products with water to remove the catalyst. Alternatively, excess acylating agent can be destroyed by addition of water or an alkanol and the product then isolated by precipitation with a large quantity of water followed by filtration or extraction. The enol acylates can be purified by chromatograph and crystallization if desired.

The 3,5-androstandiene 3,17-diacylates of Formulae Ia, IIIa, IVa and Va, such as 7α,17α-dimethyl-3,5-androstadiene-3,17β-diol 3,17-diacylate (Ia), 7α-methyl-19-nor-3,5-androstandiene-3,17β-diol 3,17-diacylate (Ia), 2α,7α-dimethyl-17α-ethynyl-3,5-androstandiene-3,17β - diol 3,17-diacylate (IIIa) and 2α,7α-dimethyl-19-nor-17α-n-propyl-3,5-androstandiene-3,17β-diol 3,17-diacylate (Va), are converted, e.g., by reaction with sodium borohydride in alcohol under mild conditions (e.g., about 18 hours at room temperature) to yield the corresponding 3β-hydroxy-5-androstenes, such as 7α,17α-dimethyl-3β,17β-dihydroxy-5-androstene 17-acylate (Ib), 7α-methyl-19-nor-3β,17β-dihydroxy-5-androstene 17-acylate (Ib), 2α,7α - dimethyl-17α - ethynyl-3β,17β-dihydroxy-5-androstene 17-acylate (IIIb) and 2α,7α-dimethyl-19-nor-17α-n-propyl-3β,17β-dihydroxy-5-androstene 17-acylate (Vb); the thus produced 17-acylates can be converted to the corresponding 17β-alcohols under mild reaction conditions, e.g., by treatment at room temperature with lithium aluminum hydride in a solvent such as tetrahydrofuran.

The 3,5-androstadiene 3,17-diacylates lacking a 17α-substituent are directly converted to the corresponding 3β,17β-dihydroxy-5-androstenes by treatment under mild reaction conditions, e.g., by treatment with sodium borohydride in alcohol at room temperature for about 15 hours.

The 3β,17β-dihydroxy-5-androstenes of Formulae Ib,

IIIb, IV, and Vb are converted to the corresponding 3-acylates or 3,17-diacylates of the 5-androstenes (Ic, IIIc IVc and Vc) by treatment with a carboxylic acid anhydride or acid chloride in pyridine at moderate (e.g., room) to reflux temperature.

The 3β-hydroxy-5-androstenes of Formulae Ib through Vb of this invention can also be prepared in accordance with the following reaction sequence:

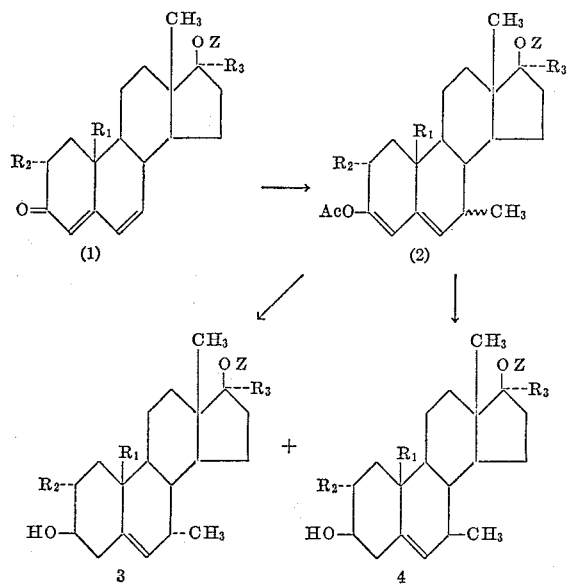

wherein $R_1$ and $R_2$ have the same meaning as above: Ac is the acyl radical of an organic carboxylic acid containing from one to twelve carbon atoms, inclusive; $R_3$ is hydrogen, lower alkyl and alkyne; Z is hydrogen, lower acyl, and tetrahydropyranyl; $R_3$+OZ is keto.

Methyl magnesium bromide (or iodide) and cuprous chloride catalyst is added with cooling to purified tetrahydrofuran and a compound of Formula I dissolved in purified tetrahydrofuran added slowly thereto with stirring. The operation is carried under an atmosphere of nitrogen and an anhydride or chloride of an organic carboxylic acid (e.g., acetic anhydride or acetyl chloride) in tetrahydrofuran added slowly. After several hours of stirring the reaction mixture is extracted with a solvent such as ether, acidified and with care exercised to remove all traces of oxygen by purging with nitrogen. The organic phase is washed, neutralized and dried in the usual manner. The thus obtained crude residue of enol acetate (2) can be purified by chromatography, recrystallization or other commonly employed method of purification.

To a solution of the crude enol acylate (2) in a solvent such as 95% ethanol purged with nitrogen, sodium borohydride in a solvent such as 95% ethanol is added. The mixture is stirred for about 20 hours at room temperature and concentrated to a small volume. A water-acetic acid mixture (purged with nitrogen) is added slowly with cooling. The product is extracted with a solvent such as methylene chloride and washed successively with dilute acid, base, water, dried and the solvent removed. The residue contains the 7α-methyl-3β-hydroxy-5-androstene (3) and corresponding 7β-epimer (4), which can be separated by conventional means such as chromatography, crystallization, counter current distribution, zone melting or vacuum distillation.

When $R_3$ is other than hydrogen, Z will not change during the reaction sequence. When both $R_3$ and Z are hydrogen, the 17-hydroxyl group will be acylated in the step, (1), (2). In the step (2), (3) and (4) the acyl group will be only partially hydrolyzed, thus providing both 17-hydroxy and 17-acylate analogues. When Z is tetrahydropyranyl it remains intact throughout the reaction sequence. When $R_3$+OZ is keto in the last step it is reduced to the 17-hydroxy group ($R_3$ and Z are hydrogen).

The 7α-methyl(and 2α,7α-dimethyl)-3β,17β-dihydroxy-5-androstenes of Formulae Ib through Vb can be converted to their appropriate corresponding 3-monoacylates and 3,17-diacylates (Ic through Vc) by reaction with an anhydride or acyl chloride of an organic carboxylic acid (e.g., acetic anhydride or acetyl chloride) in pyridine under mild reaction conditions (e.g., at room temperature).

7α-methyl(and 2α,7α-dimethyl)-3β,17β-dihydroxy-5-androstene 3-dihydropyranyl ethers (f), 7α-methyl(and 2α,7α-dimethyl)-3β-hydroxy-5-androsten-17-one 3 - dihydropyranyl ethers (g), 7α-methyl (and 2α,7α-dimethyl)-3β-hydroxy-5-androsten-17-ones (h) and their 19-nor counterparts can be prepared in accordance with the following series of reactions:

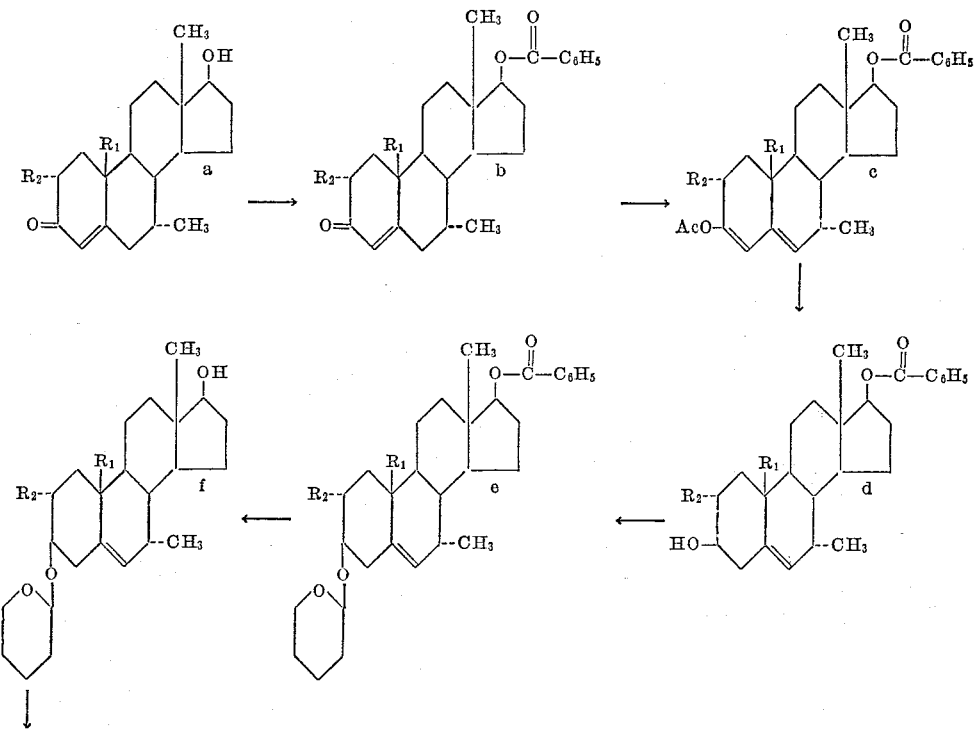

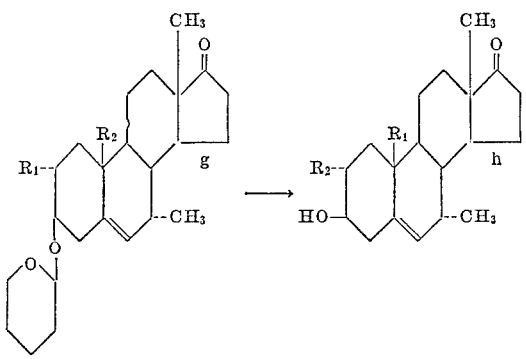

The conversion of the compounds of Formula a to the compounds of Formula b is carried out by treating the compounds of Formula a, such as 2α,7α-dimethyl-17β-hydroxy-4-androsten-3-one (a) with benzoyl chloride in pyridine to obtain the compounds of Formula b such as, 2α,7α-dimethyl - 17β-hydroxy-4-androsten-3-one 17-benzoate (b).

Treating a compound of Formula b, such as, 2α,7α-dimethyl - 17β - hydroxy-4-androsten-3-one 17-benzoate (b) with an acylating agent, for example an anhydride, an acyl chloride or an acyl bromide of an organic carboxylic acid, preferably a hydrocarbon acid containing from one to twelve carbon atoms, inclusive, in the presence of an acid catalyst such as paratoluenesulfonic acid, sulfuric acid, perchloric acid and the like, or an isopropenyl acylate wherein the acyl group is of a hydrocarbon carboxylic acid as defined above, yields the compounds of Formula c, such as 2α,7α-dimethyl-3,5-androstadiene-3β,17β-diol 3-acylate 17-benzoate (c).

The conversion of the compounds of Formula c, such as 2α,7α-dimethyl-3,5-androstadiene-3β,17β-diol 3-acylate 17-benzoate (c) to the compounds of Formula d, such as 2α,7α-dimethyl-3β,17β-dihydroxy-5-androstene 17-benzoate (d), is carried out by treating a representative compound of Formula c with a reducing agent such as sodium borohydride in a non-acidic organic solvent, for example, alcohol, tetrahydrofuran, ether, diethyleneglycol, diethylamine, dioxane, dimethyl ether, and the like, at between about 0° C. to about 100° C. for between about 0.25 to about 2 hours.

The conversion of the compounds of Formula d, such as 2α,7α-dimethyl - 3β,17β - dihydroxy-5-androstene 17-benzoate (d) to the compounds of Formula e, such as 2α,7α-dimethyl-3β,17β-dihydroxy-5-androstene 3-dihydropyranyl ether 17-benzoate (e) is carried out by reacting a compound of Formula d with dihydropyran in the presence of a Lewis acid, such as boron trifluoride etherate, paratoluenesulfonic acid, sulfuric acid, phosphorus oxychloride and the like. Advantageously, the reaction can be carried out without added solvent or in the presence of an organic solvent such as ether, benzene and the like. The reaction is carried out at temperatures of from about 0° C. to about 80° C. with a temperature of 25° C. being preferred.

The hydrolysis of the compounds of Formula e, such as 2α,7α-dimethyl-3β,17β-dihydroxy-5-androstene 3-dihydropyranyl ether 17-benzoate (e) to the compounds of Formula f, such as 2α,7α-dimethyl-3β,17β-dihydroxy-5-androstene 3-dihydropyranyl ether (f) is carried out in an alkaline aqueous medium employing relatively water soluble alkali metal carbonates, alkaline earth metal carbonates, alkali metal hydroxides, alkaline earth hydroxides, e.g., sodium or potassium carbonate, sodium or potassium hydroxide, calcium hydroxide and the like, preferably potassium carbonate. Advantageously there is added to the alkaline aqueous medium an inert water-miscible organic solvent, such as methanol, ethanol, isopropyl alcohol, and the like, with methanol preferred. The reaction is carried out at temperatures of between about 10° C. to about 100° C. for a period of between about 1 to 20 hours.

The oxidation of the compounds of Formula f, such as 2α,7α-dimethyl-3β,17β-dihydroxy-5-androstene 3-dihydropyranyl ether (f) to the compounds of Formula g, such as 2α,7α-dimethyl-3β-hydroxy-5-androsten-17-one 3-dihydropyranyl ether (g) is carried out by reacting a compound of Formula f with an oxidizing agent in the presence of an organic solvent. Suitable oxidizing agents are chromic anhydride-pyridine complex, chromic anhydride, sulfuric acid, sodium dichromate and the like; suitable solvents are pyridine, acetone, acetone-water, acetic acid and the like, with chromic anhydride-pyridine complex preferred. The reaction is carried out at temperatures of 0° C. to about 50° C. for from about 2 to about 20 hours.

The removal of the dihydropyranyl ether group is carried out by treating the compounds of Formula g, such as 2α,7α-dimethyl-3β-hydroxy-5-androsten-17-one 3-dihydropyranyl ether (g) with an acid in the presence of an organic solvent to obtain the compounds of Formula h, such as 2α,7α-dimethyl-3β - hydroxy-5-androsten-17-one (h). Preferably the acid is a mineral acid such as hydrochloric, hydrobromic, sulfuric acids, and the like; suitable solvents are acetone-water, methanol-water, dimethylsulfoxide-water, dimethylformamide-water and the like. The reaction is conveniently carried out at a temperature of about 10° C. to about 50° C. for from about 5 to about 50 hours.

The compounds of Formulae b through h are recovered following their synthesis by fractional crystallization; chromatography of the total crude reaction product on acid washed alumina, Florisil (synthetic magnesium silicate), silica gel, or silicic acid, elution with commercial hexanes containing increasing percentages of acetone or benzene containing increasing percentages of methanol; Craig countercurrent partition separation; column partition chromatography; preparative paper chromatography; thin-layer chromatography; a combination of the foregoing methods.

The compounds of Formulae Ib through Vb and Ic through Vc of the present invention have anabolic and androgenic activity of improved therapeutic ratio of the former versus the latter. They also possess gonadotropin inhibiting, anti-fertility, anti-androgenic and anti-estrogenic activities. They also have the ability to reduce the level of cholesterol in the blood, inhibit platelet stickiness, and reduce clot lysis time and consequently are of therapeutic value in the treatment or prevention of atherosclerosis and thromboembolic disease. The foregoing properties make the new compounds useful in veterinary practice.

The compounds of the invention can be prepared and administered to mammals, birds, and animals, in a wide variety of oral or parenteral dosage forms, singly or in admixture with other coacting compounds. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

EXAMPLE 1

2α,7α-dimethyl-17β-hydroxy-4-androsten-3-one (2α,7α-dimethyltestosterone) (I)

A solution of 9.96 g. (0.331 mole) of 7α-methyl-17β-hydroxy-4-androsten-3-one (7α-methyltestosterone) (I) (prepared in the manner disclosed in J. Amer. Chem. Soc., 81, 4069) in 150 ml. of t-butyl alcohol was treated with stirring at about 60° C. with 10 ml. of ethyl oxalate followed by 13 ml. of 25 percent sodium methoxide solution. Heating was stopped and stirring continued for about 20 minutes, while the temperature of the reaction mixture was allowed to decline without external cooling. After the addition of about 120 ml. of anhydrous ether and a further period of about 20 minutes of stirring, the yellow glyoxalate was collected by filtration, washed with ether and dried at about 70° C. in vacuo. The crude glyoxalate weighing 9.17 g. was mixed with 30 g. of potassium carbonate, 30 ml. of methyl iodide and 250 ml. of acetone; the mixture was stirred while heating under gentle reflux for a period of about 24 hours. The reflux condenser was removed and the reaction flask arranged for distillation. After between about 75 and 100 ml. had distilled, the reaction mixture was filtered and the filtrate evaporated to dryness to give 10 g. of solid. This material was dissolved in 125 ml. of methanol, purged with nitrogen and treated with 10 ml. of similarly purged 25 percent sodium methoxide solution. After about 2 hours at room temperature, 250 ml. of saturated salt solution was added, the mixture extracted with methylene chloride, dried and evaporated to an amber gum. This crude product was purified by chromatography on 350 g. of Florisil (synthetic magnesium silicate). Thirty-five fractions of 550 ml. volume were collected using a gradient from 100 percent Skellysolve B (hexane hydrocarbons) to 10 percent acetone-90 percent Skellysolve B. Fractions 18 to 28 contained 2.68 g. of crystals which after two recrystallizations from a mixture of acetone and Skellysolve B gave pure $2\alpha,7\alpha$-dimethyl-$17\beta$ - hydroxy-4-androsten-3-one (I), melting at 170 to 180° C.;

$\lambda_{max.}^{alc.}$ 214 m$\mu$; $\epsilon=15,560$; $\nu_{max.}^{Nujol}$ 3450 1655, 1622, 1225 and 1075 cm.$^{-1}$

*Analysis.*—Calcd. for $C_{21}H_{32}O_2$: C, 79.70; H, 10.19. Found: C, 79.59; H, 10.49.

Following the procedure of Example 1, but substituting for the starting steroid $7\alpha$-methyl-$17\beta$-hydroxy-4-androsten-3-one (I), $7\alpha$-methyl-19-nor-$17\beta$ - hydroxy-4-androsten-3-one (I) yields, $2\alpha,7\alpha$ - dimethyl-19-nor-$17\beta$-hydroxy-androsten-3-one (I).

EXAMPLE 2

$2\alpha,7\alpha,17\alpha$-trimethyl-$17\beta$-hydroxy-4-androsten-3-one ($2\alpha,7\alpha,17\alpha$-trimethyltestosterone) (I)

To a solution of 50 g. of $7\alpha,17\alpha$-dimethyl-$17\beta$-hydroxy-4 - androsten-3-one ($7\alpha,17\alpha$ - dimethyltestosterone) (1) (prepared as in J. Amer. Chem. Soc. 81, 4069) in 750 ml. of t-butyl alcohol, warmed to 55° C. in a nitrogen atmosphere, 50 ml. of ethyl oxalate and 65 ml. of 25 percent sodium methoxide solution was added with stirring. Stirring was continued for about 20 minutes after which 750 ml. of ether was added. The mixture was filtered and the solid of yellow glyoxalate dried in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. The filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25 percent sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6 percent of acetone and the remainder Skellysolve B eluted 13.34 g. of crystals, which on recrystallization from acetone-Skellysolve B yielded 11.53 g. of the desired product (I) melting at 158 to 159° C. A portion of this material was recrystallized from the same solvent pair to provide an analytical sample of pure $2\alpha,7\alpha,17\alpha$-trimethyl-$17\beta$-hydroxy-4-androsten-3-one (I) melting at 158 to 159° C.;

$\lambda_{max.}^{alc.}$ 242 m$\mu$; $\epsilon=15,500$; $\nu^{Nujol}$ 3435, 1665, 1622, 1220, 1166, 1075 cm.$^{-1}$ Depression of the melting point of the product ((I) [$R_2$=$CH_2$]) occurred on mixture with the starting material ((I) [$R_2$=H]).

*Analysis.*—Calcd. for $C_{22}H_{34}O_2$: C, 79.95; H, 10.37. Found: C, 79.60; H, 10.48.

Following the procedure of Example 2, but substituting for the starting steroid $7\alpha,17\alpha$-dimethyl-$17\beta$-hydroxy-4-androsten-3-one (I), the following representative starting material:

(1) $7\alpha,17\alpha$-dimethyl-19-nor-$17\beta$-hydroxy-4 - androsten-3-one (I) yields, (2) $2\alpha,7\alpha,17\alpha$-trimethyl-19-nor-$17\beta$ - hydroxy-4-androsten-3-one (I).

EXAMPLE 3

$7\alpha,17\alpha$-dimethyl-$17\beta$-hydroxy-4-androsten-3-one 17-acetate (I)

A solution of 10 g. of $7\alpha,17\alpha$-dimethyl-$17\beta$-hydroxy-4-androsten-3-one (I) in 20 ml. of acetic anhydride and 50 ml. of pyridine was refluxed under nitrogen for about 16 hours. The solvent was removed on a rotary evaporator leaving a brown crystalline residue. It was triturated with Skellysolve B, the crystals washed with Skellysolve B and methanol, and recrystallized from acetone-Skellysolve B to give 5 g. of product melting at 187 to 191° C. Part of the product was recrystallized from acetone-Skellysolve B to give an analytical sample of $7\alpha,17\alpha$-dimethyl-$17\beta$-hydroxy-4-androsten-3-one 17-acetate (I): melting point 190 to 192° C.;

$\lambda_{max.}^{alc.}$ 242 m$\mu$ ($\epsilon=16,750$); $[\alpha]_D+90°$ (chloroform)

*Analysis.*—Calcd. for $C_{23}H_{34}O_3$: C, 77.05; H, 9.56. Found: C, 76.85; H, 9.68.

Following the procedure of Example 3 but substituting $2\alpha,7\alpha$,dimethyl,$17\beta$-hydroxy-4-androsten-3 - one (I) and $2\alpha,7\alpha,17\alpha$-trimethyl - $17\beta$ - hydroxy-4-androsten-3-one as starting materials, yields the corresponding 17 - acetates (I).

EXAMPLE 4

$2\alpha,7\alpha$-dimethyl-$17\beta$-hydroxy-4-androsten-3-one 17-acetate ($2\alpha,7\alpha$-dimethyl-testosterone 17-acetate) (I)

(a) A solution of 1 g. of $2\alpha,7\alpha$-dimethyl-$17\beta$-hydroxy-4-androsten-3-one (I), dissolved in 6 ml. of pyridine, is treated with 6 ml. of acetic anhydride. After standing at room temperature for about 17 hours, the reaction mixture is poured into ice water. The mixture is filtered after about two hours of standing and the precipitate washed with water and dried in vacuo. Upon recrystallization from a mixture of acetone and hexane, pure $2\alpha,7\alpha$-dimethyl-$17\beta$-hydroxy-4-androsten-3-one 17-acetate (I) is obtained.

$2\alpha,7\alpha,17\alpha$ - trimethyl-$17\beta$-hydroxy-4-androsten-3-one 17-benzoate ($2\alpha,7\alpha,17\alpha$-trimethyltestosterone 17-benzoate (I)

(b) A suspension of 0.3 g. of $2\alpha,7\alpha,17\alpha$-trimethyl-$17\beta$-hydroxy-4-androsten-3-one (I) in 12 ml. of benzene is treated with 0.3 ml. of distilled benzoyl chloride and 0.3 ml. of dry pyridine. The mixture is stirred and warmed until acylation is complete as determined by thin layer chromatography on alumina. After cooling the product is precipitated with water, dissolved in methylene chloride, washed with dilute acid and base, dried over sodium sulfate, and filtered. Removal of the solvent leaves the residue of the benzoate. It was crystallized from acetone-Skellysolve B or by other conventional means to give pure $2\alpha,7\alpha,17\alpha$ - trimethyl-$17\beta$-hydroxy-4-androsten-3-one 17-benzoate (I).

In the same manner as given in Example 4 (*a* and *b*), the $17\beta$-cyclopentylpropionate, formate, butyrate, valerate, isovalerate, hexanoate, octanoate, phenylacetate and other like 17-esters of 2α,7α-dimethyl and 2α,7α,17α-trimethyltestosterone (I) are prepared by the reaction with the appropriate acid anhydride or halide.

Similarly, following the procedures of Example 4 (a and b) and the paragraph directly above, the following representative 17β-hydroxy compounds are converted to a desired 17-ester named therein:

(1) 2α,7α - dimethyl-19-nor-17β-hydroxy-17α-ethynyl-4-androsten-3-one (I) and (2) 2α,7α,17α-trimethyl-19-nor-17β - hydroxy-4-androsten-3-one (I).

EXAMPLE 5

7α-methyl-19-nor-17β-hydroxy-17α-ethynyl-4-androsten-3-one (III)

(A) 7α-METHYL-19-NOR-4-ANDROSTENE-3,17-DIONE 3-PYRROLIDINYL ENAMINE

To a solution of 10 g. of 7α-methyl-19-nor-4-androstene-3,17 - dione (II) (prepared as in Belgian Patent 610,385) in a minimum volume of boiling methanol, 10 ml. of pyrrolidine was added. The resulting solution was concentrated by boiling and allowed to cool. The crystalline solid which separated was isolated by filtration, washed with a small volume of methanol and dried. There was thus obtained 7α-methyl-19-nor-4-androstene-3,17-dione 3-pyrrolidinyl enamine in the form of a crystalline solid melting at 151 to 160° C. The ultraviolet absorption spectrum of the compound (in ether solution) exhibited a maximum at 282 mμ ($\epsilon$=23,450). The infrared absorption spectrum (in a mineral oil mull) showed maxima at 1735, 1635, 1600, 1200, 1180, 1155 and 1035 cm.$^{-1}$.

(B) 7α-METHYL-19-NOR-17β-HYDROXY-17α-ETHYNYL-4-ANDROSTEN-3-ONE (III)

A volume of 1 ml. of a 20 percent by weight suspension of sodium acetylide in xylene was centrifuged and the solid that separated was taken up in 6 ml. of redistilled dimethyl sulfoxide. To the resulting mixture was added the 3-pyrrolidinyl enamine from 0.5 g. of 7α-methyl-19-nor-4-androstene-3,17-dione, prepared as described in (A), above. The mixture so obtained was maintained under an atmosphere of nitrogen for about 5 hours, after which time the excess sodium acetylide was destroyed by dropwise addition of water. About 2 ml. of water and 5 ml. of methanol was added to obtain a clear solution which was then heated on a steam bath for 1 hour. The mixture so obtained was extracted with ether and the etheral extract washed successively with dilute hydrochloric acid, dilute sodium carbonate, and water, then dried over anhydrous magnesium sulfate. The dried solution was filtered and the filtrate evaporated to dryness. The residue was triturated with a mixture of ether and Skellysolve B and recrystallized twice from a mixture of acetone and Skellysolve B. There was thus obtained 0.161 g. of 7α - methyl - 19 - nor-17β-hydroxy-17α-ethynyl-4-androsten-3-one (III) with a melting point of 197 to 199.5° C.;

$\lambda_{max.}^{ethanol}$ 240.5 mμ; $\nu_{max.}^{Nujol}$ 3,390, 3,240, 2,100; 1,663 and 1,623 cm.$^{-1}$ Analysis.—Calcd. for $C_{21}H_{28}O_2$: C, 80.72; H, 9.03. Found: C, 80.44; H, 9.05.

Following the procedure of Example 5 but substituting 2α,7α-dimethyl-19-nor-4-androstene-3,17-dione (II) and 2α,7α-dimethyl-4-androstene-3,17-dione (II) for the starting material employed therein, yields, respectively, (a) 2α,7α-dimethyl - 19 - nor-4-androstene-3,17-dione-3-pyrrolidinyl enamine and 2α,7α-dimethyl-4-androstene-3,17-dione-3-pyrrolidinyl enamine and (b) 2α,7α - dimethyl-19-nor-17β-hydroxy-17α-ethynyl-4-androsten-3-one (III), 2α,7α-dimethyl - 17β - hydroxy-17α-ethynyl-4-androsten-3-one (III).

Following the procedure of Example 5 but substituting the following reagents for sodium acetylide:

(1) sodium methylacetylide, (2) sodium chloroacetylide,
(3) sodium bromoacetylide and
(4) sodium trifluoromethylacetylide, yields, respectively, (1) 7α - methyl-19-nor-17β-hydroxy-17α(1-propynyl)-4-androsten-3-one (III), (2) 7α-methyl - 19 - nor-17β-hydroxy-17α-chloroethynyl-4-androsten-3-one (III), (3) 7α-methyl - 19 - nor-17β-hydroxy-17α-bromoethynyl-4-androsten-3-one (III) and (4) 7α - methyl-19-nor - 17β - hydroxy-17α-trifluoromethylethynyl-4-androsten-3-one (III).

Following the procedure of Example 5 and the two hereinabove paragraphs yields:

(1) 2α,7α - dimethyl - 19 - nor - 17β - hydroxy-17α(1-propynyl)-4-androsten-3-one (III), (2) 2α,7α-dimethyl - 17β - hydroxy-17α(1-propynyl)-4-androsten-3-one (III), (3) 2α,7α-dimethyl - 19 - nor-17β-hydroxy-17α-chloroethynyl-4-androsten-3-one (III), (4) 2α,7α-dimethyl-17β-hydroxy - 17α - chloroethynyl-4-androsten-3-one (III), (5) 2α,7α - dimethyl-19-nor-17β-hydroxy-17α-bromoethynyl-4-androsten-3-one (III), (6) 2α,7α - dimethyl-17β-hydroxy-17α-bromoethynyl-4-androsten-3-one (III), (7) 2α,7α - dimethyl - 19 - nor-17β-hydroxy-17α-trifluoromethylethynyl-4-androsten-3-one (III) and (8) 2α,7α - dimethyl-17β-hydroxy-17α-trifluoromethylethynyl-4-androsten-3-one (III).

Following the procedures of Example 5 and the subsequent two paragraphs, but substituting the respective 3-enamine, 3-ketal or 3-enol ether of the following starting materials (prepared from the corresponding 3-ketosteroid, e.g., in the manner disclosed in J. Amer. Chem. Soc. 78, 430, ibid. 80, 4717 and ibid. 75, 650, respectively);

(a) 7α-methyl-4-androstene-3,17-dione (II),
(b) 7α-methyl-19-nor-4-androstene-3,17-dione (II),
(c) 2α,7α-dimethyl-4-androstene-3,17-dione (II) and
(d) 2α,7α-dimethyl-19-nor-4-androstene-3,17-dione (II), followed by cleavage of the aforesaid protecting group at the 3-position to restore the 3-keto function (in the manner described in the above-cited publications), yields, respectively, (a)(1) 7α - methyl-17β-hydroxy - 17α - ethynyl-4-androsten-3-one (III), (a)(2) 7α-methyl - 17β - hydroxy-17α(1-propynyl)-4-androsten-3-one (III), (a)(3) 7α - methyl-17β-hydroxy-17α-chloroethynyl-4-androsten-3-one (III), (a)(4) 7α - methyl-17β-hydroxy-17α-bromoethynyl-4-androsten-3-one (III), (a)(5) 7α-methyl - 17β - hydroxy-17α-trifluoromethylethynyl-4-androsten-3-one (III), (b)(1) 7α-methyl - 19 - nor-17β-hydroxy-17α-ethynyl-4-androsten-3-one (III), (b)(2) 7α - methyl - 19 - nor - 17β - hydroxy-17α(1-propynyl)-4-androsten-3-one (III), (b)(3) 7α - methyl - 19 - nor-17β-hydroxy-17α-chloroethynyl-4-androsten-3-one (III), (b)(4) 7α-methyl-19-nor - 17β - hydroxy-17α-bromoethynyl-4-androsten-3-one (III), (b)(5) 7α - methyl-19-nor-17β-hydroxy-17α-trifluoromethylethynyl-4-androsten-3-one (III), (c)(1) 2α,7α-dimethyl - 17β - hydroxy-17α-ethynyl-4-androsten-3-one (III), (c)(2) 2α,7α - dimethyl - 17β - hydroxy - 17α(1-propynyl)-4-androsten-3-one (III), (c)(3) 2α,7α - dimethyl-17β-hydroxy-17α-chloroethynyl-4-androsten-3-one (III), (c)(4) 2α,7α - dimethyl-17β-hydroxy-17α-bromoethynyl-4-androsten-3-one (III), (c)(5) 2α,7α-dimethyl-17β-hydroxy-17α-trifluoromethylethynyl-4-androsten-3-one (III),
(d)(1) 2α,7α-dimethyl-19-nor-17β-hydroxy-17α-ethynyl-4-androsten-3-one (III),
(d)(2) 2α,7α-dimethyl-19-nor-17β-hydroxy-17α(1-propynyl)-4-androsten-3-one (III),
(d)(3) 2α,7α-dimethyl-19-nor-17β-hydroxy-17α-chloroethynyl-4-androsten-3-one (III),
(d)(4) 2α,7α-dimethyl-19-nor-17β-hydroxy-17α-bromoethynyl-4-androsten-3-one (III) and
(d)(5) 2α,7α-dimethyl-19-nor-17β-hydroxy-17α-trifluoromethylethynyl-4-androsten-3-one (III).

EXAMPLE 6

7α-methyl-19-nor-17β-hydroxy-17α-ethyl-4-androsten-3-one (7α-methyl-17α-ethyl-19-nortestosterone) (IV)

A suspension of 90 mg. of 1 percent palladium on carbon catalyst in 50 ml. of dioxane (purified as described in Fieser, "Methods of Organic Chemistry," page 368, 2nd edition) was saturated with hydrogen at atmospheric pressure. To the dioxane suspension 300 mg. of 7α-methyl-19-nor-17β-hydroxy-17α-ethynyl-4-androsten-3-one (III), prepared as in Example 5(B), was added and hydrogenated at atmospheric pressure until two equivalents of hydrogen was consumed. The reaction mixture was filtered through a bed of Celite (diatomaceous earth), the filtrate concentrated to dryness and chromatographed through a 100 g. column of Clorisil packed wet with Skellysolve B. Elution by a gradient technique employing between 4 l. of 2 percent acetone-Skellysolve B collecting 250 ml. fractions, gave the desired product as an oil in fractions 21 to 30. The oil was crystallized twice from a mixture of Skellysolve B and ether to give 160 mg. of 7α-methyl-19-nor-17β-hydroxy-17α-ethyl-4-androsten-3-one (IV), melting at 132 to 135° C., $$\lambda_{max}^{alc.}\ 241\ m\mu\ (\epsilon=11,200)$$

An analytical sample from another run melted at 138 to 139° C., $$\lambda_{max}^{alc.}\ 241\ m\mu\ (\epsilon=17,000)$$

*Analysis.*—Calcd. for $C_{21}H_{32}O_2$: C, 79.69; H, 10.19. Found: C, 79.42; H, 10.23.

Following the procedure of Example 6 but substituting the following compounds for the starting material employed therein:

(a) 7α-methyl-17β-hydroxy-17α-ethynyl-4-androsten-3-one (III),
(b) 7α-methyl-19-nor-17β-hydroxy-17α-ethynyl-4-androsten-3-one (III),
(c) 2α,7α-dimethyl-17β-hydroxy-17α-ethynyl-4-androsten-3-one (III) and
(d) 2α,7α-dimethyl-19-nor-17β-hydroxy-17α-ethynyl-4-androsten-3-one (III), yields the corresponding 17α-ethyl counterparts of (a), (b), (c) and (d) of Formula IV.

Following the procedure of Example 6 but substituting the following compounds for the starting material employed therein:

(1) 7α-methyl-17β-hydroxy-17α(1-propynyl)-4-androsten-3-one (III),
(2) 7α-methyl-17β-hydroxy-17α-trifluoromethylethynyl-4-androsten-3-one (III),
(3) 7α-methyl-19-nor-17β-hydroxy-17α(1-propynyl)-4-androsten-3-one (III),
(4) 7α-methyl-19-nor-17β-hydroxy-17α-trifluoromethylethynyl-4-androsten-3-one (III),
(5) 2α,7α-dimethyl-17β-hydroxy-17α(1-propynyl)-4-androsten-3-one (III),
(6) 2α,7α-dimethyl-17β-hydroxy-17α-trifluoromethylethynyl-4-androsten-3-one (III),
(7) 2α,7α-dimethyl-19-nor-17β-hydroxy-17α(1-propynyl)-4-androsten-3-one (III), and
(8) 2α,7α-dimethyl-19-nor-17β-hydroxy-17α-trifluoromethylethynyl-4-androsten-3-one (III), yields respectively, (1) 7α-methyl-17β-hydroxy-17α-propyl-4-androsten-3-one (IV),
(2) 7α-methyl-17β-hydroxy-17α-(3,3,3-trifluoropropyl)-4-androsten-3-one (IV),
(3) 7α-methyl-19-nor-17β-hydroxy-17α-propyl-4-androsten-3-one (IV),
(4) 7α-methyl-19-nor-17β-hydroxy-17α-(3,3,3-trifluoropropyl)-4-androsten-3-one (IV),
(5) 2α,7α-dimethyl-17β-hydroxy-17α-propyl-4-androsten-3-one (IV),
(6) 2α,7α-dimethyl-17β-hydroxy-17α-(3,3,3-trifluoropropyl)-4-androsten-3-one (IV),
(7) 2α,7α-dimethyl-19-nor-17β-hydroxy-17α-propyl-4-androsten-3-one (IV),
(8) 2α,7α-dimethyl-19-nor-17β-hydroxy-17α-(3,3,3-trifluoropropyl)-4-androsten-3-one (IV),

EXAMPLE 7

7α,17α-dimethyl-19-nor-17β-hydroxy-4-androsten-3-one (V)

A solution of 2 g. of 7α-methyl-19-nor-4-androstene-3,17-dione (II) (prepared as in Belgian Patent 610,385) (after protecting the 3-ketone by forming the corresponding 3-enamine, enol ether or ketal) in 100 ml. of 2 N methylmagnesium bromide in a mixture of equal volumes of benzene and tetrahydrofuran, is heated under reflux for about 18 hours. Most of the solvent is evaporated in a stream of nitrogen. The concentrate is poured into ice-water the protecting group at 3 is removed according to well known methods (e.g., Example 5). The crude material is chromatographed through a 150 g. column of Woelm neutral alumina. The desired produce is eluted and crystallized from acetone-Skellysolve B to give 7α,17α-dimethyl-19-nor-17β-hydroxy-4-androsten-3-one (V).

Following the procedure of Example 7 but substituting for methylmagnesium bromide, the following Grignard reagents:

(1) ethylmagnesium bromide (or chloride),
(2) n-propylmagnesium bromide (or chloride),
(3) i-propylmagnesium bromide (or chloride), and
(4) n-butylmagnesium bromide (or chloride), yields, respectively, (1) 7α-methyl-17α-ethyl-19-nor-17β-hydroxy-4-androsten-3-one (V),
(2) 7α-methyl-17α-n-propyl-19-nor-17β-hydroxy-4-androsten-3-one (V),
(3) 7α-methyl-17α-i-propyl-19-nor-17β-hydroxy-4-androsten-3-one (V) and
(4) 7α-methyl-17α-n-butyl-19-nor-17β-hydroxy-4-androsten-3-one (V).

Following the procedures of Example 7 and the paragraph immediately preceding the present one, reaction of the following pairs of starting materials and (1) 7α-methyl-19-nor-4-androstene-3,17-dione 3-pyrrolyidinyl enamine [prepared as in Example 5(a)] and ethylmagnesium bromide,
(2) 7α-methyl-4-androstene-3,17-dione 3-pyrrolidinyl enamine and n-propylmagnesium bromide,
(3) 2α,7α-dimethyl-19-nor-4-androstene-3,17-dione 3-pyrrolidinyl enamine and methylmagnesium bromide and
(4) 2α,7α-dimethyl-19-nor-4-androstene-3,17-dione 3-pyrrolyidinyl enamine and methylmagnesium bromide.

followed by hydrolyzing the products with a base, yields, respectively, (1) 7α-methyl-17α-ethyl-19-nor-17β-hydroxy-4-androsten-3-one (V),
(2) 7α-methyl-17α-n-propyl-17β-hydroxy-4-androsten-3-one (V), (3) 2α,7α,17α-trimethyl-19-nor-17β-hydroxy-4-androsten-3-one (V) and
(4) 2α,7α,17α-trimethyl-17β-hydroxy-4-androsten-3-one (V).

Following the procedure of the Example 7 and the paragraph thereafter, reaction of the following pairs of starting materials and Grignard reagents:
(1) 7α-methyl-4-androstene-3,17-dione (II) and isopropyl magnesium bromide,
(2) 7α-methyl-4-androstene-3,17-dione (II) and n-butylmagnesium bromide,
(3) 2α,7α-dimethyl-19-nor-4-androstene-3,17 - dione (II) and methylmagnesium bromide, and
(4) 2α,7α-dimethyl - 4 - androstene-3,17-dione (II) and ethylmagnesium bromide, yields, respectively, (1) 7α-methyl-17α-isopropyl-17β-hydroxy-4-androsten-3-one (V),
(2) 7α-methyl-17α-n-butyl-17β - hydroxy-4-androsten-3-one (V),
(3) 2α,7α,17α-trimethyl-19-nor-17β-hydroxy-4-androsten-3-one (V) and
(4) 2α,17α-dimethyl-17α-ethyl-17β-hydroxy-4-androsten-3-one (V).

The 7α-methyl (and 2α,7α-dimethyl)-17α-alkyl-17β-hydroxy compounds (V) produced in Example 7 and the three paragraphs immediately above, can be converted to their corresponding 17-acylates by following the procedures of Example 4 and the paragraph thereafter.

EXAMPLE 8

7α-methyl-3,17β-diol-3,5-androstadiene 3,17-diacetate (Ia)

A solution of 1 g. of 7α-methyl-17β-hydroxy-4-androsten-3-one (I) (prepared as in J. Amer. Chem. Soc. 81, 4069), 100 mg. of paratoluenesulfonic acid and 10 ml. of acetic anhydride in 40 ml. of toluene was heated at reflux under nitrogen for about 4.5 hours. The solvent was evaporated with a stream of nitrogen and the crystalline residue triturated with a small amount of aqueous methanol to yield crystalline 7α-methyl-3,5-androstadiene-3,17β-diol 3,17-diacetate (Ia).

EXAMPLE 9

7α-methyl-19-nor-3,5-androstadiene-3,17β-diol 3,17-diacetate (Ia)

A solution of 1 g. of 7α-methyl-19-nor-17β-hydroxy-4-androsten-3-one (I) (prepared as in Example 28 of Belgian Patent 610,385), 40 mg. of paratoluenesulfonic acid, 8 ml. of acetic anhydride in 20 ml. of toluene was refluxed under nitrogen for about 5 hours. Most of the solvent was removed with a stream of nitrogen to give a sticky precipitate. A few milliliters of methanol containing a few drops of pyridine was added to the precipitate to yield loose crystals which were filtered immediately, washed with cold methanol and dried to yield 0.9 g. of the desired enol acetate (Ia). This product was recrystallized by dissolving in methylene chloride and diluting with methanol at room temperature to give pure 7α-methyl-19-nor-3,5-androstadiene-3,17b - diol 3,17-diacetate (Ia) having a rotation $[\alpha]_D$ of −122° (chloroform) and $\lambda_{max.}^{a'c.}$ 235 mμ ($\epsilon$=19,250)

Analysis.—Calcd. for $C_{23}H_{32}O_4$: C, 74.16; H, 8.66. Found: C, 73.69; H, 8.40.

EXAMPLE 10

7α,17α-dimethyl-3,5-androstadiene-3,17-diol 3,17-diacetate (Ia)

A solution of 1 g. of 7α,17α-dimethyl-17β-hydroxy-4-androsten-3-one 17-acetate (I) (prepared as in Example 3), 100 mg. of paratoluenesulfonic acid and 10 ml. of acetic anhydride in 40 ml. of toluene was heated at reflux under nitrogen for about 4.5 hours. The solvent was then removed with a stream of nitrogen to leave a residue that was triturated with Skellysolve B. Two crops of crystals were obtained from the Skellysolve B. The combined crops were triturated with methanol and removed most of the color to give 0.57 g. of 7α,17α-dimethyl-3,5-androstadiene-3,17β-diol 3,17-diacetate (Ia) having $\lambda_{max.}^{alc.}$ 234.5 mμ ($\epsilon$=20,450)

244 mμ ($\epsilon$=15,650) with a shoulder at 230 mμ.

Following the procedures of Examples 8, 9 and 10 but substituting for acetic anhydride another anhydride, such as propionic, butyric, valeric, hexanoic, trimethylacetic, isobutyric, isovaleric, cyclohexanecarboxylic, p-hexylpropionic, benzoic, phenylacetic, acrylic, crotonic, undecylenic, propiolic, cinnamic, maleic and citraconic, yields, respectively, the corresponding 7α-methyl-3,5-androstadiene-3,17β-diol 3,17-diacylate (Ia), 7α-methyl-19-nor-3,5-androstadiene-3,17β-diol 3,17-diacylate (Ia) and 7α,17α-dimethyl-3,5-androstadiene-3,17β-diol 3,17-diacylate (Ia).

Following the procedures of Examples 8, 9 and 10 but substituting for the starting steroids employed therein the following representative compounds:
(1) 2α,7α-dimethyl-17β-hydroxy-4-androsten-3-one (I),
(2) 2α,7α-dimethyl-19-nor-17β - hydroxy-4-androsten-3-one (I),
(3) 2α,7α17α-trimethyl-17β - hydroxy-4-androsten-3-one (I),
(4) 7α,17α-dimethyl-19-nor-17β - hydroxy-4-androsten-3-one (I),
(5) 7α-methyl-4-androstene-3,17-dione (II),
(6) 7α-methyl-19-nor-4-androstene-3,17-dione (II),
(7) 2α,7α-dimethyl-4-androstene-3,17-dione (II),
(8) 7α-methyl-19-nor-17β-hydroxy-17α - ethynyl-4-androsten-3-one (III),
(9) 7α-methyl-17β - hydroxy-17α-ethylnyl-4-androsten-3-one (III),
(10) 7α-methyl-19-nor-17β - hydroxy-17α(1 - propynyl)-4-androsten-3-one (III),
(11) 7α-methyl-17β-hydroxy-17α-trifluoromethylethynyl-4-androsten-3-one (III),
(12) 2α,7α-dimethyl-17β-hydroxy-17α - chloroethynyl-4-androsten-3-one (III),
(13) 2α,7α-dimethyl-19-nor-17β-hydroxy - 17α - bromoethynyl-4-androsten-3-one (III),
(14) 7α-methyl-19-nor - 17β-hydroxy-17α-ethyl-4-androsten-3-one (IV),
(15) 7α-methyl-17β - hydroxy-17α-propyl-4-androsten-3-one (IV),
(16) 7α-methyl-19-nor-17β-hydroxy-17α(3,3,3 - trifluoropropyl)-4-androsten-3-one (IV),
(17) 7α-methyl-17α-ethyl-19-nor-17β - hydroxy-4-androsten-3-one (V) and
(18) 2α,7α-dimethyl-17α-n-propyl-17β - hydroxy-4-androsten-3-one (V), yields, respectively, (1) 2α,7α-dimethyl-3,5-androstadiene-3,17β-diol 3,17-diacetate (Ia),
(2) 2α,7α-dimethyl-19-nor-3,5-androstadiene - 3,17β-diol 3,17-diacetate (Ia),
(3) 2α,7α,17α-trimethyl-3,5-androstadiene-3,17β - diol 3, 17-diacetate (Ia),
(4) 7α,17α-dimethyl-19-nor-3,5-androstadiene-3,17β-diol 3,17-diacetate (Ia),
(5) 7α-methyl-3,5-androstadiene-3,17β-diol 3,17-diacetate (Ia),
(6) 7α-methyl-19-nor-3,5-androstadiene-3,17β-diol 3,17-diacetate (Ia),
(7) 2α,7α-dimethyl-3,5-androstadiene-3,17β-diol 3,17-diacetate (Ia),
(8) 7α-methyl-19-nor-3,5-androstadiene-3,17β-diol 17α-ethynyl 3,17-diacetate (IIIa), (9) 7α-methyl-17α-ethynyl-3,5-androstadiene-3,17β - diol 3,17-diacetate (IIIa),
(10) 7α-methyl-19-nor-17α(1 - propynyl)-3,5-androstadiene-3,17β-diol 3,17-diacetate (IIIa),
(11) 7α-methyl-17α-trifluoromethylethynyl - 3,5 - androstadiene-3,17β-diol 3,17-diacetate (IIIa),
(12) 2α,7α-dimethyl - 17α - chloroethynyl-3,5-androstadiene-3,17β-diol 3,17-diacetate (IIIa),
(13) 2α,7α-dimethyl-19-nor-17α-bromoethynyl-3,5-androstadiene-3,17β-diol 3,17-diacetate (IIIa),
(14) 7α-methyl-19-nor-17α-ethyl-3,5-androstadiene-3,17-diol 3,17-diacetate (IVa),
(15) 7α - methyl-17α-propyl-3,5-androstadiene-3,17β-diol 3,17-diacetate (IVa),
(16) 7α-methyl-19-nor-(3,3,3-trifluoropropyl)-3,5-androstadiene-3,17β-diol 3,17-diacetate (IVa)
(17) 7α-methyl-17α-ethyl-9-nor-3,5-androstadiene-3,17β-diol 3,17-diacetate (Va) and
(18) 2α,7α-dimethyl-17α-n-propyl-3,5-androstadiene-3,17β-diol 3,17-diacetate (Va)

Similarly, by following the procedures of the two preceding paragraphs and reacting the Δ⁴-3-keto starting materials of (1) through (20) of the immediately preceding paragraph with the appropriate hydrocarbon carboxylic acid anhydride instead of acetic anhydride employed to prepare the products of (1) through (20) there are produced the corresponding 3,5-androstadiene 3,17-diacylates of (1) through (20) such as the 3,17-dibutyrate, 3,17-divalerate, 3,17-dihexanoate, 3,17-ditrimethylacetate, 3,17-diisobutyrate, 3,17 - diisovalerate 3-17 - dicyclohexanecarboxylate, 3,17 - dicyclopentylpropionate, 3,17 - di- β-hexylpropionate, 3,17 - dibenzoate, 3,17 - diphenylacetate, 3,17 - diacrylate, 3,17 - dicrotonate, 3,17-diundecylanate, 3,17-dipropiolate, 3,17 - dicinnamate, 3,17 - dimaleate and 3,17-dicitraconate, 3,17-diphenylpropionate.

EXAMPLE 11

7α,17α-dimethyl-3,5-androstadiene-3,17β-diol 3-acetate (Ia)

To a solution of 100 ml. of tetrahydrofuran (purified by percolation through an alumina column) cooled in an ice bath, 25 ml. of ethereal 3 M methyl magnesium bromide and 1.5 g. of cuprous chloride are successively added. A solution of 5 g. of 17α - methyl - 17β-hydroxy-4,6-androstadien-3-one (A) (prepared as in J. Amer. Chem. Soc., 81, 4069) in 120 ml. of tetrahydrofuran (purified as above) is added slowly with stirring. The whole operation is done under nitrogen. After about 5 minutes 20 ml. of acetic anhydride in 20 ml. of tetrahydrofuran (also purified as above) is slowly added. The mixture is stirred for about an additional 2.5 hours; 100 ml. of ether is added and 3 N hydrochloric acid saturated with sodium chloride (well purged with nitrogen to remove all traces of oxygen) is carefully added to the mixture. The organic phase is washed again with nitrogen purged 3 N hydrochloric acid saturated with sodium chloride, saturated sodium chloride solution, 5% sodium hydroxide solution saturated with sodium chloride and finally with saturated sodium chloride solution until neutral. The solution is dried over sodium sulfate and concentrated to dryness. This product is a mixture of the 7α and 7β methylisomers. The crude material can be carried on to the next step (Example 12) or purified by chromatography to yield 7α,17α - dimethyl-3,5-androstadiene-3,17β-diol 3-acetate (Ia).

Following the procedure of Example 11 but substituting for acetic anhydride another anhydride, such as propionic, butyric, valeric, hexanoic, trimethylacetic, isobutyric, isovaleric, cyclohexanecarboxylic, p-hexylpropionic, benzoic, phenylacetic, acrylic, crotonic, undecylenic, propiolic, and cinnamic, and yields the corresponding 7α-17α-dimethyl-3,5-androstadiene-3,17β-dihydroxy 3-monoacylate (Ia).

Following the procedure of Example 11 but substituting for 17α - methyl - 17β - hydroxy-4,6-androstadiene-3-one (A) the following representative starting materials:

(1) 17α methyl - 19 - nor-17β-hydroxy-4,6-androstadien-3-one (A),
(2) 2α,17α - dimethyl - 17β - hydroxy - 4,6-androstadien-3-one (A),
(3) 2α,17α - dimethyl - 19 - nor - 17β-hydroxy-4,6-androstadien-3-one (A),
(4) 4,6-androstadiene-3,17-dione (A),
(5) 19-nor-4,6-androstadiene-3,17-dione (A),
(6) 2α-methyl-4,6-androstadiene-3,17-dione (A),
(7) 2α - methyl - 19 - nor-4,6-androstadiene-3,17-dione (A),
(8) 17β - hydroxy-17α-ethynyl - 4,6 - androstadien-3-one (A),
(9) 2α - methyl - 19 - nor - 17β-hydroxy-17α-ethynyl-4,6-androstadien-3-one (A)
(10) 17β - hydroxy - 17α(1-propynyl)-4,6-androstadien-3-one (A),
(11) 17β - hydroxy - 17α - trifluoromethylethynyl4,6-androstadien-3-one (A),
(12) 2α - methyl - 17β - hydroxy-17α-chloroethynyl-4,6-androstadien-3-one (A),
(13) 2α - methyl -19 - nor - 17β-hydroxy-17α-bromoethynyl-4,6-androstadien-3-one (A),
(14) 19 - nor - 17β - hydroxy-17α-ethyl-4,6-androstadien-3-one (A),
(15) 17β-hydroxy - 17α - propyl-4,6-androstadien-3-one (A),
(16) 19 - nor - 17β -hydroxy-17α-(3,3,3-trifluoropropyl)-4,6-androstadien-3-one (A),
(17) 17α - ethyl - 19 - nor - 17β-hydroxy-4,6-androstadien-3-one (A), and
(18) 2α - methyl -17α - n-propyl-17β-hydroxy-4,6-androstadien-3-one (A), yields, respectively, (1) 7α,17α - dimethyl - 19-nor-3,5-androstadiene-3-17β-diol 3-acetate (Ia),
(2) 2α,7α,17α - trimethyl - 3,5 - androstadiene - 3,17β-diol 3-acetate (Ia),
(3) 2α,7α,17α - trimethyl - 19-nor-3,5-androstadiene-3,17β-diol 3-acetate (Ia),
(4) 3-hydroxy - 7α - methyl - 3,5 - androstadien-17-one 3-acetate (IIa),
(5) 3 - hydroxy - 7α - methyl-19-nor-3,5-androstadien-17-one 3-acetate (IIa),
(6) 3-hydroxy - 2α,7α - dimethyl - 3,5 - androstadien-17-one 3-acetate (IIa),
(7) 3α - hydroxy - 2α,7α-dimethyl-19-nor-3,5-androstadien-17-one 3-acetate (IIa),
(8) 7α - methyl - 17α - ethynyl - 3,5-androstadien-3,17β-diol 3-acetate (IIIa),
(9) 2α,7α - dimethyl-17α - ethynyl - 19-nor-3,5-androstadien-13,17β-diol 3-acetate (IIIa),
(10) 7α-methyl-17α(1 - propynyl) - 3,5 - androstadiene-3,17β-diol 3-acetate (IIIa),
(11) 7α - methyl - 17α - trifluoromethylethynyl-3,5- androstadiene-3,17β-diol 3-acetate (IIIa),
(12) 2α,7α - dimethyl - 17α - chloroethynyl-3,5-androstadiene-3,17β-diol 3-acetate (IIIa),
(13) 2α,7α - dimethyl - 17α - bromoethynyl-3,5-androstadiene-diol 3-acetate (IIIa),
(14) 7α - methyl - 17α - ethyl - 19-nor-3,5-androstadiene-3,17β-diol 3-acetate (IVa),
(15) 17β-hydroxy - 17α - propyl-4,6-androstadien-3-one diol 3-acetate (IVa),
(16) 7α - methyl - (3,3,3-trifluoropropyl)-19-nor-3,5-androstadiene-3,17-diol 3-acetate (IVa),
(17) 7α - methyl - 17α-ethyl-19-nor-3,5-androstadiene-3,17β-diol 3 acetate (Va) and
(18) 2α,7α - dimethyl - 17α-n-propyl-3,5-androstadiene-3,17β-diol 3-acetate (Va)

Similarly, by following the procedures of the preceding two paragraphs and reacting the Δ⁴,⁶-3-keto starting materials of (1) through (18) of the immediately preceding paragraph with methyl magnesium bromide followed by the appropriate hydrocarbon carboxylic acid anhydride in the manner described in Example 11, there are produced the corresponding 7α-methyl 3,5-androstadiene and 19-norandrostadiene 3-acylates of (1) through (18).

When R is hydrogen in Formula A the process of Example 11 produces the corresponding 17-acylate (1a).

EXAMPLE 12

7α,17α-dimethyl-3β,17β-dihydroxy-5-androstene-17-acetate (Ib)

To a solution of 0.5 g. of 7α,17α-dimethyl-3,5-androstadiene-3,17β-diol 3,17-diacetate (Ia) mixed with the corresponding 7β- isomer (Ib) in 15 ml. of 95% ethanol purged with nitrogen, a solution of 0.5 g. of sodium borohydride dissolved in 15 ml. of 95% alcohol (also purged of nitrogen) was added. The resulting solution was kept at room temperature for about 18 hours and concentrated to a volume of about 20 ml. Dilute acetic acid which had been purged with nitrogen was added. The product was extracted with ether, washed with dilute acid, water, dilute sodium hydroxide again with water until neutral, dried over sodium sulfate and concentrated to dryness. The product consists of a mixture of 7α,17α-dimethyl-3β,17β-dihydroxy-5-androstene 17-acetate (Ib) and 7β,17α-dimethyl-3β,17β - dihydroxy-5-androstene 17-acetate (Ib). They can be separated by fractional crystallization from acetone and acetone-Skellysolve B. Other conventional means of separation can also be used such as Florisil or Alumina column chromatography, countercurrent distribution, zone melting, high vacuum distillation or vapor phase chromatography.

Following the procedure of Example 12 but substituting for 7α,17α-dimethyl-3,5-androstadiene-3,17β-diol 3,17-diacetate (Ia) the following representative starting materials:

(1) 2α,7α-dimethyl-3,5-androstadiene-3,17β-diol 3,17-diacetate(Ia),
(2) 2α,7α-dimethyl-19-nor-3,5-androstadiene-3,17β-diol 3,17-diacetate (Ia),
(3) 2α,7α,17α-trimethyl-3,5-androstadiene-3,17β-diol 3,17-diacetate (Ia),
(4) 7α,17α-dimethyl-19-nor-3,5-androstadiene-3,17β-diol 3,17-diacetate (Ia),
(5) 7α-methyl-3,5-androstadiene-3,17β-diol 3,17-diacetate (Ia),
(6) 7α-methyl-19-nor-3,5-androstadiene-3,17β-diol 3,17-diacetate (Ia),
(7) 7α,17α-dimethyl-3,5-androstadiene-3,17β-diol 3,17-diacetate (Ia),
(8) 17α-ethynyl-7α-methyl-19-nor-3,5-androstadiene-3,17β-diol, 3,17-diacetate (IIIa),
(9) 7α-methyl-17α-ethynyl-3,5-androstadiene-3,17β-diol 3,17-diacetate (IIIa),
(10) 7α-methyl-17α-(1-propynyl)-19-nor-3,5-androstadiene-3,17β-diol 3,17-diacetate (IIIa),
(11) 7α-methyl-17α-trifluoromethylethynyl-3,5-androstadiene-3,17β-diol 3,17-diacetate (IIIa),
(12) 2α,7α-dimethyl-17α-chloroethynyl-3,5-androstadiene-3,17β-diol 3,17-diacetate (IIIa),
(13) 2α,7α-dimethyl-17α-bromoethynyl-19-nor-3,5-androstadiene-3,17β-diol 3,17-diacetate (IIIa),
(14) 7α-methyl-17α-ethyl-19-nor-3,5-androstadiene-3,17β-diol 3,17-diacetate (IVa),
(15) 7α-methyl-17α-propyl-3,5-androstadiene-3,17β-diol 3,17-diacetate (IVa),
(16) 7α-methyl-(3,3,3-trifluoropropyl)-19-nor-3,5-androstadiene-3,17β-diol 3,17-diacetate (IVa),
(17) 7α-methyl-17α-ethyl-19-nor-3,5-androstadiene-3,17β-diol 3,17-diacetate (Va) and
(18) 2α,7α-dimethyl-17α-n-propyl-3,5-androstadiene-3,17β-diol 3,17-diacetate (Va), yields, respectively, (1) 2α,7α-dimethyl-3β,17β-dihydroxy-5-androstene 17-acetate (Ib),
(2) 2α,7α-dimethyl-19-nor-3β,17β-dihydroxy-5-androstene 17-acetate (Ib),
(3) 2α,7α,17α-trimethyl-3β,17β-dihydroxy-5-androstene-17-acetate (Ib),
(4) 7α,17α-dimethyl-19-nor-3β,17β-dihydroxy-5-androstene-17-acetate (Ib),
(5) 7α-methyl-3β,17β-dihydroxy-5-androstene 17-acetate (Ib),
(6) 7α-methyl-19-nor-3β,17β-dihydroxy-5-androstene 17-acetate (Ib),
(7) 7α,17α-dimethyl-3β,17β-dihydroxy-5-androstene 17-acetate (Ib),
(8) 7α-methyl-19-nor-3β,17β-dihydroxy-17α-ethynyl-5-androstene 17-acetate (IIIb),
(9) 7α,-methyl-3β,17β-dihydroxy-17α-ethynyl-5-androstene 17-acetate (IIIb),
(10) 7α-methyl-19-nor-3β,17β-dihydroxy-17α(1-propynyl)-5-androstene 17-acetate (IIIb),
(11) 7α-methyl-3β,17β-dihydroxy-17α-trifluoromethylethynyl-5-androstene 17-acetate (IIIb),
(12) 2α,7α-dimethyl-3β,17β-dihydroxy-17α-chloroethynyl-5-androstene 17-acetate (IIIb),
(13) 2α,7α-dimethyl-19-nor-3β,17β-dihydroxy-17α-bromoethynyl-5-androstene 17-acetate (IIIb),
(14) 7α-methyl-19-nor-3β,17β-dihydroxy-17α-ethyl-5-androstene 17-acetate (IVb),
(15) 7α-methyl-3β,17β-dihydroxy-17α-propyl-5-androstene 17-acetate (IVb),
(16) 7α-methyl-19-nor-3β,17β-dihydroxy-17α-(3,3,3-trifluoropropyl)-5-androstene 17-acetate (IVb),
(17) 7α-methyl-19-nor-3β,17β-dihydroxy-17α-ethyl-5-androstene 17-acetate (Vb) and
(18) 2α,7α-dimethyl-3β,17β-dihydroxy-17α-n-propyl-5-androstene 17-acetate (Vb).

Similarly, following the procedures of Example 12 and the paragraph immediately preceding the present one, but substituting other 3,5-androstadiene 3,17-diacylates for the 3,5-androstadiene 3,17-diacetates employed therein, e.g., the 3,17-dipropionates, 3,17-dibutyrates, 3,17-dicrotonates, 3,17-dicinnamates, etc., yields the corresponding 7α-methyl(7α17α-dimethyl and 2α,7α,17α-trimethyl)-3β,17β-dihydroxy-5-androstene 17-acylates and the corresponding 19-nor counterparts.

EXAMPLE 13

7α,17α-dimethyl-3β,17β-dihydroxy-5-androstene (Ib)

To a nitrogen purged solution of 0.38 g. of 7α,17α-dimethyl-3β,17β-dihydroxy-5-androstene 17-acetate (Ib) 20 ml. of purified tetrahydrofuran, 1 g. of lithium aluminum hydride was slowly added with stirring under nitrogen. After about 24 hours at room temperature the excess hydride was destroyed by the addition of ethyl acetate. The solution was acidified with hydrochloric acid and the product extracted with ether. The ether was washed with dilute acid dilute base and dried. The solvent was removed and the residue recrystallized from acetone-water and from acetone-Skellysolve B to give 160 mg. of pure 7α,17α-dimethyl-3β,17β-dihydroxy-5-androstene (Ib) melting at 193 to 194° C. Infrared and nuclear magnetic resonance spectra support the proposed structure.

Following the procedure of Example 13 but substituting for 7α,17α-dimethyl-3β,17β-dihydroxy-5-androstene 17-acetate (Ib) the following representative starting materials:

(1) 2α,7α-dimethyl-3β,17β-dihydroxy-5-androstene 17-acetate (Ib),
(2) 2α,7α-dimethyl-19-nor-3β,17β-dihydroxy-5-androstene 17-acetate (Ib)
(3) 2α,7α,17α-trimethyl-3β,17β-dihydroxy-5-androstene 17-acetate (Ib)

(4) 7α,17α-dimethyl-19-nor-3β,17β-dihydroxy-5-androstene 17-acetate (Ib),
(5) 7α-methyl-3β,17β-dihydroxy-5-androstene 17-acetate (Ib),
(6) 7α-methyl-19-nor-3β,17β-dihydroxy-5-androstene 17-acetate (Ib),
(7) 7α,17α-dimethyl-3β,17β-dihydroxy-5-androstene 17-acetate (Ib),
(8) 7α-methyl-19-nor-3β,17β-dihydroxy-17α-ethynyl-5-androstene 17-acetate (IIIb),
(9) 7α-methyl-3β,17β-dihydroxy-17α-ethynyl-5-androstene 17-acetate (IIIb),
(10) 7α-methyl-19-nor-3β,17β-dihydroxy-17α (1-propynyl)-5-androstene 17-acetate (IIIb)
(11) 7α-methyl-3β,17β-dihydroxy-17α-trifluoromethylethynyl-5-androstene 17-acetate (IIIb)
(12) 2α,7α-dimethyl-3β,17β-dihydroxy-17α-chloroethynyl-5-androstene 17-acetate (IIIb),
(13) 2α,7α-dimethyl-19-nor-3β,17β-dihydroxy-17α-bromoethynyl-5-androstene 17-acetate (IIIb),
(14) 7α-methyl-19-nor-3β,17β-dihydroxy-17α-ethyl-5-androstene 17-acetate (IVb),
(15) 7α-methyl-3β,17β-dihydroxy-17α(3-propynyl)-5-androstene 17-acetate (IVb),
(16) 7α-methyl-19-nor-3β,17β-dihydroxy-17α-(3,3,3-trifluoropropyl)-5-androstene 17-acetate (IVb),
(17) 7α-methyl-17α-ethyl-19-nor-3β,17β-dihydroxy-5-androstene 17-acetate (Vb) and
(18) 2α,7α-dimethyl-17α-n-propyl-3β,17β-dihydroxy-5-androstene 17-acetate (Vb), yields, respectively, (1) 2α,7α-dimethyl-3β,17β-dihydroxy-5-androstene (Ib),
(2) 2α,7α-dimethyl-19-nor-3β,17β-dihydroxy-5-androstene (Ib),
(3) 2α,7α,17α-trimethyl-3β,17β-dihydroxy-5-androstene (Ib),
(4) 7α,17α-dimethyl-19-nor-3β,17β-dihydroxy-5-androstene (Ib),
(5) 7α-methyl-3β,17β-dihydroxy-5-androstene (Ib)
(6) 7α-methyl-19-nor-3β,17β-dihydroxy-5-androstene (Ib),
(7) 7α,17α-dimethyl-3β,17β-dihydroxy-5-androstene (Ib),
(8) 7α-methyl-19-nor-3β,17β-dihydroxy-17α-ethynyl-5-androstene (IIIb),
(9) 7α-methyl-3β,17β-dihydroxy-17α-ethynyl-5-androstene (IIIb),
(10) 7α-methyl-19-nor-3β,17β-dihydroxy-17α (1-propynyl)5-androstene (IIIb)
(11) 7α-methyl-3β,17β-dihydroxy-17α-trifluoromethylethynyl-5-androstene (IIIb),
(12) 2α,7α-dimethyl-3β,17β-dihydroxy-17α-chloroethynyl-5-androstene (IIIb),
(13) 2α,7α-dimethyl-19-nor-3β,17β-dihydroxy-17α-bromoethynyl-5-androstene (IIIb),
(14) 7α-methyl-19-nor-3β,17β-dihydroxy-17α-ethyl-5-androstene (IVb),
(15) 7α-methyl-3β,17β-dihydroxy-17α-propyl-5-androstene (IVb),
(16) 7α-methyl-19-nor-3β,17β-dihydroxy-17α-(3,3,3-trifluoropropyl)-5-androstene (IVb),
(17) 7α-methyl-17α-ethyl-19-nor-3β,17β-dihydroxy-5 androstene (Vb) and
(18) 2α,7α-dimethyl-17α-n-propyl-3β,17β-dihydroxy-5-androstene (Vb).

Similarly, following the procedures of Example 13 and the paragraph immediately preceding the present one, but substituting other 7α-methyl (and 7α,17α-dimethyl and 2α,7α,17α - trimethyl) - 3β,17β - dihydroxy - 5 - androstene 17-acylates, e.g., the 17-propionates, 17-butyrates, 17-crotonate, 17-cinnamates, etc., for the corresponding 17-acetates employed therein, also yields the corresponding 17β-hydroxy compounds.

EXAMPLE 14

7α-methyl-3β,17β-dihydroxy-5-androstene (Ib)

A solution purged of nitrogen and containing 20 g. of 7α-methyl-3,5-androstadiene-3,17β-dihydroxy 3,17-diacetate (Ia) in 300 ml. of 95% alcohol had a solution of 10 g. of sodium borohydride in 250 ml. of 95% alcohol (also purged with nitrogen) added thereto under an atmosphere of nitrogen, with stirring and cooling in an ice bath. After stirring for about 16 hours the excess borohydride was destroyed by dropwise addition of acetic acid. The solution was concentrated with a rotary evaporator at about room temperature to a volume of about 250 ml. The product was precipitated with water and washed with dilute hydrochloric acid, water and ether and recrystallized three times from acetone to give 1.6 g. of 7α - methyl - 3β,17β - dihydroxy - 5 - androstene (Ib), having a melting point of 213 of 216° C. and a rotation [α]$_D$ of −124° (dioxane).

The mother liquors are reduced to dryness and chromatographed through a column of Florisil. Gradient elution using increasing amounts of acetone in Skellysolve B elutes 7α-methyl-5-androstene-3,17-diol 17-acetate followed by additional amounts of 7α-methyl-5-androstene-3,17-diol (Ib). The acetate is recrystallized several times from acetone-Skellysolve B to give a pure product.

(1) 7α-methyl-19-nor-3,5-androstadiene-3,17β-diol 3,17-diacetate (Ia),
(2) 2α,7α-dimethyl-3,5-androstadiene-3,17β-diol 3,17-diacetate (Ia) and
(3) 2α,7α-dimethyl-19-nor-3,5-androstadiene-3,17β-diol 3,17-diacetate (Ia), yields, respectively, (1) 7α-methyl-19-nor-3β,17β-dihydroxy-5-androstene (Ib), and 7α-methyl-19-nor-3β,17β-dihydroxy-5-androstene 17-acetate,
(2) 2α,7α-dimethyl-3β,17β-dihydroxy-5-androstene (Ib) and 2α,7α-dimethyl-3β,17β-dihydroxy-5-androstene 17-acetate and
(3) 2α,7α-dimethyl-19-nor-3β,17β-dihydroxy-5-androstene (Ib) and 2α,7α-dimethyl-19-nor-3β,17β-dihydroxy-5-androstene 17-acetate.

Following the procedure of Example 14 and the paragraph thereafter, but substituting the 7β-epimers for the corresponding 7α-methyl starting materials employed therein, yields the corresponding 7β-methyl products.

EXAMPLE 15

7α-methyl-3β,17β-dihydroxy-5-androstene 3-dihydropyranyl ether 17-acetate (Ib)

To 1.8 g. of 7α-methyl-3β,17β-dihydroxy-5-androstene 17-acetate (Ib) (obtained in accordance with the procedure of Example 12 and the paragraph thereafter and Example 14 and the paragraph thereafter) suspended in 10 ml. of dihydropyran and 50 ml. of ether, 100 mg. of p-toluenesulfonic acid is added. The ether solution is stored for about 16 hours, extracted successively with sodium bicarbonate solution, saturated sodium chloride solution, dried over anhydrous sodium sulfate and evaporated to dryness under reduced pressure to yield 7α-methyl-3β,17β-dihydroxy-5-androstene 3-dihydropyranyl ether 17-acetate (Ia). This residue is employed in Example 16 without further purification.

Similarly substituting a stoichiometrically equivalent amount of (1) 7α-methyl-19-nor-3β,17β-dihydroxy-5-androstene 17-acetate (Ib),
(2) 2α,7α-dimethyl-3β,17β-dihydroxy-5-androstene 17-acetate (Ib),
(3) 2α,7α-dimethyl-19-nor-3β,17β-dihydroxy-5-androstene 17-acetate (Ib),
(4) 7α-methyl-3β,17β-dihydroxy-5-androstene (Ib) and (5) 2α,7α-dimethyl-19-nor-3β,17β-dihydroxy-5-androstene (Ib), yields, respectively, (1) 7α-methyl-19-nor-3β,17β-dihydroxy-5-androstene 3-dihydropyranyl ether 17-acetate (Ib),
(2) 2α,7α-dimethyl-3β,17β-dihydroxy-5-androstene 3-dihydropyranyl ether 17-acetate (Ib),
(3) 2α,7α-dimethyl-19-nor-3β,17β-dihydroxy-5-androstene 3-dihydropyranyl ether 17-acetate (Ib),
(4) 7α-methyl-3β,17β-dihydroxy-5-androstene 3,17-bis(dihydropyranyl ether) (Ib) and
(5) 2α,7α-dimethyl-19-nor-3β,17β-dihydroxy-5-androstene 3,17-bis(dihydropyranyl ether) (Ib).

3,17-bis(dihydropyranyl ether) compounds corresponding to those prepared in the preceding paragraph but in addition possessing a 17α-alkyl substituent, can be produced in a manner similar to the method of Example 15 but employing phosphorus oxychloride instead of p-toluenesulfonic acid as the catalyst and allowing the reaction to proceed for several days. Utilizing the aforesaid method and the following starting materials:

(1) 7α,17α-dimethyl-3β,17β-dihydroxy-5-androstene 17-acetate (Ib) and
(2) 7α-methyl-19-nor-17α-ethyl-3β,17β-dihydroxy-5-androstene 17-acetate (Vb)

yields, respectively, (1) 7α,17α-dimethyl-3β,17β-dihydroxy-5-androstene 3,17-bis(dihydropyranyl ether) (Ib) and
(2) 7α-methyl-19-nor-17α-ethyl-3β,17β-dihydroxy-5-androstene 3,17-bis(dihydropyranyl ether) (Vb).

EXAMPLE 16

7α-methyl-3β,17β-dihydroxy-5-androstene 3-dihydropyranyl ether (Ib)

The residue comprising 7α-methyl-3β,17β-dihydroxy-5-androstene 3-dihydropyranyl ether 17-acetate (Ib) (obtained in Example 15) is dissolved in 100 ml. of 5% potassium carbonate in methanol-water (4:1) solution and the reaction mixture heated to reflux for about 1.5 hours. The solvents are removed under reduced pressure to give a residue comprising 7α-methyl-3β,17β-dihydroxy-5-androstene 3-dihydropyranyl ether (Ib), which is used in the following experiment without further purification.

Similarly substituting for the residue comprising 7α-methyl-3β,17β-dihydroxy-5-androstene 3-dihydropyranyl ether (Ib) the residues comprising (1) 7α-methyl-19-nor-3β,17β-dihydroxy-5-androstene 3-dihydropyranyl ether 17-acetate (Ib),
(2) 2α,7α-dimethyl-3β,17β-dihydroxy-5-androstene 3-dihydropyranyl ether 17-acetate (Ib) and
(3) 2α,7α-dimethyl-19-nor-3β,17β-dihydroxy-5-androstene 3-dihydropyranyl ether 17-acetate (Ib), yields, respectively, (1) 7α-methyl-19-nor-3β,17β-dihydroxy-5-androstene 3-tetrahydropyranyl ether (Ib),
(2) 2α,7α-dimethyl-3β,17β-dihydroxy-5-androstene 3-tetrahydropyranyl ether (Ib) and
(3) 2α,7α-dimethyl-19-nor-3β,17β-dihydroxy-5-androstene 3-dihydropyranyl ether (Ib).

EXAMPLE 17

7α-methyl-3β-hydroxy-5-androsten-17-one 3-dihydropyranyl ether (IIb)

The residue comprising 7α-methyl-3β,17β-dihydroxy-5-androstene 3-dihydropyranyl ether (Ib) obtained in Example 16) is taken up in 10 ml. of pyridine and added to pyridine-chromic acid complex prepared from 2 g. of chromic anhydride in 20 ml. of pyridine. The reaction mixture is stirred for about 16 hours at room temperature, diluted with a 1:1 mixture of ether and benzene and filtered on a Celite (diatomaceous earth) pad. The filtrate is washed successively with water and saturated sodium chloride solution, dried over anhydrous sodium sulfate and evaporated to dryness under reduced pressure and the residual pyridine distilled azeotropically with toluene under reduced pressure to yield a residue comprising 7α-methyl-3β-hydroxy-5-androsten-17-one 3-dihydropyranyl ether (IIb) which was used without further purification in the following experiment.

Similarly substituting for the residues comprising 7α-methyl-3β,17β-dihydroxy-5-androstene 3-dihydropyranyl ether (Ib) the residues comprising (1) 7α-methyl-19-nor-3β,17β-dihydroxy-5-androsten 3-dihydropyranyl ether (Ib),
(2) 2α,7α-dimethyl-3β,17β-dihydroxy-5-androstene 3-dihydropyranyl ether (Ib) and
(3) 2α,7α-dimethyl-19-nor-3β,17β-dihydroxy-5-androstene 3-dihydropyranyl ether (I), yields, respectively, (1) 7α-methyl-19-nor-3β-hydroxy-5-androsten-17-one 3-dihydropyranyl ether (II),
(2) 2α,7α-dimethyl-3β-hydroxy-5-androsten-17-one 3-dihydropyranyl ether (IIb) and
(3) 2α,7α-dimethyl-19-nor-3β-hydroxy-5-androsten-17-one 3-dihydropyranyl ether (IIb).

EXAMPLE 18

7α-methyl-3β-hydroxy-5-androsten-17-one (IIb)

The residue comprising 7α-methyl-3β-hydroxy-5-androsten-17-one 3-dihydropyranyl ether (IIb) (obtained in Example 17) is taken up in 20 ml. of acetone and 2 ml. of 3 N hydrochloric acid added thereto. The reaction mixture, after standing at room temperature overnight, was diluted with water and extracted with methylene chloride. The methylene chloride was washed with water, dried over sodium sulfate and the solvent evaporated on a rotary evaporator under vacuum. The residue was purified by chromatography and recrystallized from acetone-Skellysolve to give 7α-methyl-3β-hydroxy-5-androsten-17-one (IIb).

Following the procedures of Example 18, but substituting for the residue of 7α-methyl-3β-hydroxy-5-androsten-17-one 3-dihydropyranyl ether (IIb) the following:

(1) 7α-methyl-19-nor-3β-hydroxy-5-androsten-17-one 3-dihydropyranyl ether (IIb),
(2) 2α,7α-dimethyl-3β-hydroxy-5-androsten-17-one 3-dihydropyranyl ether (IIb) and
(3) 2α,7α-dimethyl-19-nor-3β-hydroxy-5-androsten-17-one 3-dihydropyranyl ether (IIb), yields, respectively, (1) 7α-methyl-19-nor-3β-hydroxy-5-androsten-17-one (IIb),
(2) 2α,7α-dimethyl-3β-hydroxy-5-androsten-17-one (IIb) and
(3) 2α,7α-dimethyl-19-nor-3β-hydroxy-5-androsten-17-one (IIb).

EXAMPLE 19

7α-methyl-3β,17β-dihydroxy-5-androstene 3,17-diacetate (Ic)

A solution of 1 g. of 7α-methyl-3β,17β-dihydroxy-5-androstene (Ib) in 1 ml. of pyridine and 1 ml. of acetic anhydride was kept at room temperature for about 16 hours. Ice and water were added and the oily product extracted with ether. The ether was washed with dilute hydrochloric acid, water, dilute sodium bicarbonate, again with water, dried over magnesium sulfate. The organic solvent was removed by vacuum distillation. The residue was recrystallized from methanol pure 7α-methyl-3β,17β-dihydroxy-5- androstene 3,17-diacetate (Ic) melting at 104 to 106° C.

*Analysis.*—Calcd. for $C_{24}H_{36}O_4$: C, 74.96; H, 9.06. Found: C, 74.29; H, 9.56.

Following the procedure of Example 19 but substituting for 7α-methyl-3β,17β-dihydroxy-5-androstene (Ib) the following starting materials:

(1) 7α-methyl-19-nor-3β,17β-dihydroxy-5-androstene (Ib),
(2) 2α,7α-dimethyl-3β,17β-dihydroxy-5-androstene (Ib),
(3) 2α,7α-dimethyl-19-nor-3β,17β-dihydroxy-5-androstene (Ib),
(4) 7α-methyl-19-nor-3β,17β-dihydroxy-17α-ethynyl-5-androstene (IIIb),
(5) 7α-methyl-3β,17β-dihydroxy-17α(1-propynyl)-5-androstene (IIIb),
(6) 2α,7α-dimethyl-3β,17β-dihydroxy-17α-chloroethynyl-5-androstene (IIIb),
(7) 7α-methyl-19-nor-3β,17β-dihydroxy-17α-(3,3,3-trifluoropropyl)-5-androstene (IVb),
(8) 7α-methyl-17α-ethyl-19-nor-3β,17β-dihydroxy-5-androstene (Vb) and
(9) 2α,7α-dimethyl-17α-n-propyl-3β,17β-dihydroxy-5-androstene (Vb)

yields, respectively, (1) 7α-methyl-19-nor-3β,17β-dihydroxy-5-androstene 3,17-diacetate (Ic),
(2) 2α,7α-dimethyl-3β,17β-dihydroxy-5-androstene 3,17-diacetate (Ic),
(3) 2α,7α-dimethyl-19-nor-3β,17β-dihydroxy-5-androstene 3,17-diacetate (Ic),
(4) 7α-methyl-19-nor-3β,17β-dihydroxy-17α-ethynyl-5-androstene 3-acetate (IIIc),
(5) 7α-methyl-3β,17β-dihydroxy-17α(1-propynyl)-5-androstene 3-acetate (IIIc),
(6) 2α,7α-dimethyl-3β,17β-dihydroxy-17α-chloroethynyl-5-androstene 3-acetate (IIIc),
(7) 7α-methyl-19-nor-3β,17β-dihydroxy-17α-(3,3,3-trifluoropropyl)-5-androstene 3-acetate (IVc),
(8) 7α-methyl-17α-ethyl-19-nor-3β,17β-dihydroxy-5-androstene 3-acetate (Vc) and
(9) 2α,7α-dimethyl-17-n-propyl-3β,17β-dihydroxy-5-androstene 3-acetate (Vc).

Similarly, following the procedure of Example 19 and the paragraph immediately preceding the present one, but substituting for acetic anhydrides other anhydrides, e.g., propionic, butyric, crotonic and cinnamic, etc., anhydrides, yields the corresponding 7α-methyl (and 2α,7α-dimethyl)-3β,17β-dihydroxy-5-androstene 3-acylates and 3,17-diacylates and their 19-nor counterparts.

If desired, the acylation may be conducted for about six hours at reflux and with additional procedures such as chromatography or fractional crystallization.

As indicated heretofore, the compounds of this invention are useful in therapy for their anabolic, anti-fertility, anti-androgenic, anti-estrogenic and hypocholesteremic (i.e., reducing blood cholesterol) activities, and particularly in the treatment of atherosclerosis and arteriosclerosis. Administration to mammals depends on the particular compound involved, severity of the condition being treated and the individual's response to the medication. In general, a dose of about 5 to 1000 mg. of each of the compounds exemplified in Examples 12 to 19 and embraced within Formulas Ib to Vb is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

EXAMPLE 20

Compressed tablets

A lot of 10,000 compressed tablets, each containing 10 mg. of 7α,17α-dimethyl-3β,17β-dihydroxy-5-androstene is prepared from the following ingredients:

|  | Gm. |
|---|---|
| 7α,17α-dimethyl-3β,17β-dihydroxy-5-androstene, micronized | 100 |
| Dicalcium phosphate | 2500 |
| Methylcellulose, USP (15 cps.) | 65 |
| Talc, bolted | 450 |
| Calcium stearate, fine powder | 35 |

The 7α,17α-dimethyl-3β,17β-dihydroxy-5-androstene and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of hypercholesteremia.

EXAMPLE 21

Hard gelatin capsules

A lot of 1000 hard gelatin capsules, each containing 100 mg. of 7β,17α-dimethyl-3β,17β-dihydroxy-5-androstene is prepared from the following ingredients:

|  | Gm. |
|---|---|
| 7β,17α-dimethyl-3β,17β-dihydroxy-5-androstene, micronized | 100 |
| Lactose | 150 |
| Calcium stearate | 2 |
| Talc | 3 |

The lactose, talc and stearate are mixed well and the 7β,17α-dimethyl-3β,17β-dihydroxy-5-androstene incorporated into the mixture. The whole is mixed well and filled into two-piece hard gelatin capsules.

The capsules are used in the reduction of cholesterol levels at a dose of 3–6 capsules daily.

EXAMPLE 22

Soft gelatin capsules

A batch of 1000 soft gelatin capsules, each containing 50 mg. of 7α-methyl-3β,17β-dihydroxy-5-androstene and soybean oil is prepared from the following materials:

| 7α-methyl-3β,17β-dihydroxy-5-androstene, micronized | gm | 50 |
|---|---|---|
| Corn oil |  | Q.s. |

A uniform dispersion of the active ingredient in the corn oil is prepared and the dispersion filled into soft gelatin capsules by conventional means.

One capsule is given three times a day in the treatment of hypercholesteremia.

EXAMPLE 23

Aqueous oral suspension

An aqueous oral suspension containing in each 5 ml. 500 mg. of 7α-methyl-3β,17β-dihydroxy-5-androstene 3-dihydropyranyl ether is prepared from the following materials:

| 7α-methyl-3β,17β-dihydroxy-5-androstene 3-dihydropyranyl ether, micronized | gm | 1000 |
|---|---|---|
| Methylparaben USP | gm | 7.5 |
| Propylparaben USP | gm | 2.5 |
| Saccharin sodium | gm | 12.5 |
| Cyclamate sodium | gm | 2.5 |
| Glycerin | ml | 3000 |
| Tragacanth powder | gm | 100 |
| Orange oil flavor | gm | 10 |
| F.D. and C. orange dye | gm | 7.5 |
| Deionized water, q.s. to 10,000 ml. | | |

One teaspoonful (5 ml.) three times daily is employed in the treatment of hypercholesteremia.

EXAMPLE 24

Aqueous suspension for injection

A suspending vehicle is prepared from the following materials:

| | Gm. |
|---|---|
| Polyethylene glycol 4000 | 30 |
| Potassium chloride | 11.2 |
| Polysorbate 80 | 2 |
| Methylparaben | 1.8 |
| Propylparaben | 0.2 |
| Water for injection, q.s. 1000 ml. | |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of $2\alpha,7\alpha,17\alpha$-trimethyl-19-nor-$3\beta,17\beta$-dihydroxy-5-androstene which has been previously reduced to a particle size less than about 10 microns and sterilized with ethylene oxide gas. The mixture is passed through a sterilized colloid mill and filled under aseptic conditions into sterile containers which are then sealed.

Each milliliters of this suspension contains 50 mg. of $2\alpha,7\alpha,17\alpha$ - trimethyl - 19 - nor - $3\beta,17\beta$ - dihydroxy - 5-androstene. The suspension is used intramuscularly in 1-ml. doses in the treatment of hypercholesteremia.

We claim:

1. Compounds of the formula

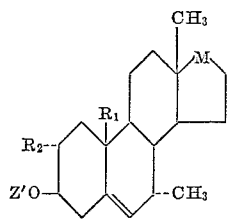

wherein $R_1$ and $R_2$ are selected from the group consisting of hydrogen and methyl; Z' is selected from the group consisting of hydrogen, the lower acyl radical of a hydrocarbon carboxylic acid containing from one to twelve carbon atoms, inclusive and tetrahydropyranyl; M is selected from the group consisting of

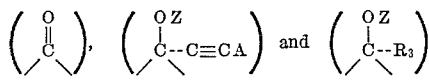

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z has the same meaning as Z'.

2. $7\alpha,17\alpha$-dimethyl-$3\beta,17\beta$-dihydroxy-5-androstene.

3. $7\alpha,17\alpha$ - dimethyl - $3\beta,17\beta$ - dihydroxy - 5 - androstene 17-acetate.

4. $7\beta,17\alpha$-dimethyl-$3\beta,17\beta$-dihydroxy-5-androstene.

5. $7\alpha$-methyl-$3\beta,17\beta$-dihydroxy-5-androstene.

6. $7\alpha$ - methyl - $3\beta,17\beta$ - dihydroxy - 5 - androstene 3,17-diacetate.

7. $7\alpha$ - methyl - $3\beta,17\beta$ - dihydroxy - 5 - androstene 3-dihydropyranyl ether.

8. $2\alpha,7\alpha$ - dimethyl - $3\beta,17\beta$ - dihydroxy - 5 - androstene 3,17-bis(dihydropyranyl ether).

9. $2\alpha,7\alpha,17\alpha$-trimethyl-$3\beta,17\beta$-dihydroxy-5-androstene.

10. $7\alpha$ - methyl - $3\beta$ - hydroxy - 5 - androsten - 17 - one 3-dihydropyranyl ether.

11. $2\alpha,7\alpha$-dimethyl-$3\beta$-hydroxy-5-androsten-17-one.

12. $7\alpha$ - methyl - $17\alpha$ - ethynyl - $3\beta,17\beta$ - dihydroxy - 5-androstene.

13. $2\alpha,7\alpha$ - dimethyl - 19 - nor - $17\alpha$ - ethynyl - $3\beta,17\beta$-dihydroxy-5-androstene.

14. $2\alpha,7\alpha$ - dimethyl - $17\alpha$ - chlorethynyl - $3\beta,17\beta$ - dihydroxy-5-androstene 17-acetate.

15. $2\alpha,7\alpha,17\alpha$ - trimethyl - 19 - nor - $3\beta,17\beta$ - dihydroxy-5-androstene.

16. $7\alpha$ - methyl - $17\alpha$ - ethyl - $3\beta,17\beta$ - dihydroxy - 5-androstene 17-dihydropyranyl ether.

17. $2\alpha,7\alpha$ - dimethyl - $17\alpha$ - ethyl - $3\beta,17\beta$ - dihydroxy-5-androstene.

18. A process for the production of a compound of the Formula III

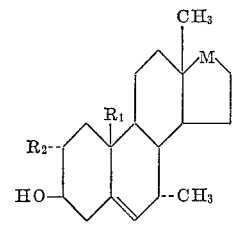

wherein $R_1$ and $R_2$ are selected from the group consisting of hydrogen and methyl; M is selected from the group consisting of

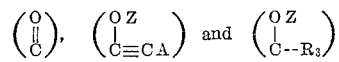

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z is selected from the group consisting of hydrogen and the lower acyl radical of an organic carboxylic acid containing from one to twelve carbon atoms, inclusive, which comprises (1) treating with a methyl magnesium halide in the presence of cuprous chloride catalyst a corresponding compound of the Formula I

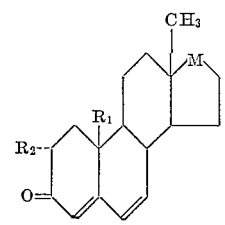

wherein $R_1$, $R_2$ and M have the same meaning as above, (2) followed by treating with an anhydride of an organic carboxylic acid containing from one to twelve carbon atoms, inclusive, to yield a corresponding compound of the Formula II

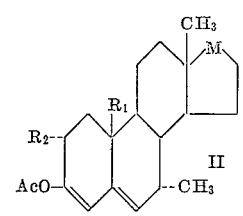

wherein Ac is the acyl radical of an organic carboxylic acid containing from one to twelve carbon atoms, inclusive, $R_1$, $R_2$ and M have the same meaning as above and (3) treating a thus produced compound of Formula II with sodium borohydride to yield a corresponding compound of Formula III, above.

19. A process for the production of a compound of the formula

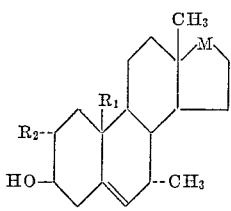

wherein $R_1$ and $R_2$ are selected from the group consisting of hydrogen and methyl; M is selected from the group consisting of

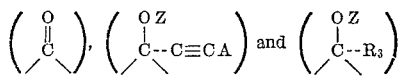

wherein A is selected from the group consisting of hydrogen, lower-alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z is selected from the group consisting of hydrogen and the lower acyl radical of a hydrocarbon carboxylic acid containing from one to twelve carbon atoms, inclusive, which comprises treating with sodium borohydride a corresponding compound of the formula

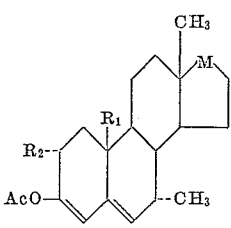

wherein Ac is the acyl radical of an organic carboxylic acid containing from one to twelve carbon atoms, inclusive, and $R_1$, $R_2$ and M have the same meanings as above.

20. A process for the production of 7α-methyl-3β,17β-dihydroxy-5-androstene which comprises treating 7α-methyl-3β,17β-dihydroxy-3,5-androstadiene 3,17-diacetate with sodium borohydride.

21. A pharmaceutical composition for oral administration and the lowering of blood cholesterol in the treatment of hypercholesteremia comprising: about 5 to about 1000 mg. of a compound of the formula

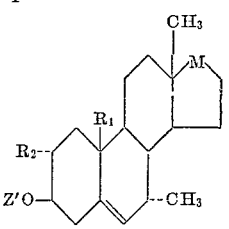

wherein $R_1$ and $R_2$ are selected from the group consisting of hydrogen and methyl; Z' is selected from the group consisting of hydrogen, the lower acyl radical of a hydrocarbon carboxylic acid containing from one to twelve carbon atoms, inclusive and dihydropyranyl; M is selected from the group consisting of

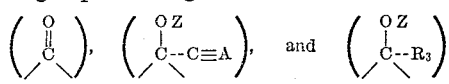

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z has the same meaning as Z' dispersed in a pharmaceutical carrier.

22. A method for reducing blood cholesterol in animals comprising administering to animals a compound of the formula

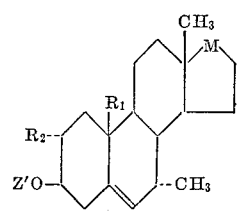

wherein $R_1$ and $R_2$ are selected from the group consisting of hydrogen and methyl; Z' is selected from the group consisting of hydrogen, the lower acyl radical of a hydrocarbon carboxylic acid containing from one to twelve carbon atoms, inclusive and dihydropyranyl; M is selected from the group consisting of

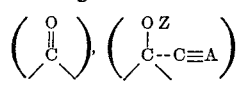

and

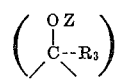

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and Z has the same meaning as Z'.

23. A compound of claim 1 wherein $R^1$, $R^2$ and Z' are hydrogen and M is

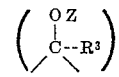

wherein $R^3$ and Z are hydrogen, namely, 7α-methyl-19-nor-3β,17β-dihydroxy-5-androstene.

24. A compound of claim 1 wherein $R^1$ is methyl, $R^2$ and Z' are hydrogen and M is

namely, 7α-methyl-3β-hydroxy-5-androsten-17-one.

25. A compound of claim 1 wherein $R^1$, $R^2$ and Z' are hydrogen and M is

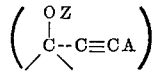

wherein A and Z are hydrogen, namely, 7α-methyl-19-nor-17α-ethynyl-3β,17β-dihydroxy-5-androstene.

References Cited

UNITED STATES PATENTS

| | | | |
|---|---|---|---|
| 3,029,263 | 4/1962 | Campbell et al. | 260—397.45 |
| 3,145,221 | 8/1964 | Djerassi et al. | 260—397.4 |
| 3,246,021 | 4/1966 | Oberster et al. | 260—397.4 |
| 3,262,949 | 7/1966 | Ringold et al. | 260—397.4 |
| 3,271,254 | 9/1966 | Burgess et al. | 260—397.4 |

OTHER REFERENCES

Atwater et al.: "Jour. Org. Chem.," vol 26, September 1961, pages 3077–3083.

LEWIS GOTTS, *Primary Examiner.*

J. BROWN, *Assistant Examiner.*